(12) United States Patent
Saito et al.

(10) Patent No.: US 10,866,875 B2
(45) Date of Patent: Dec. 15, 2020

(54) STORAGE APPARATUS, STORAGE SYSTEM, AND PERFORMANCE EVALUATION METHOD USING CYCLIC INFORMATION CYCLED WITHIN A GROUP OF STORAGE APPARATUSES

(71) Applicant: HITACHI, LTD., Tokyo (JP)

(72) Inventors: Hibiki Saito, Tokyo (JP); Tetsuya Maita, Tokyo (JP); Nobuyoshi Sakai, Tokyo (JP); Yuusuke Asai, Tokyo (JP); Naoki Ogawa, Tokyo (JP); Tatsuya Kimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 48 days.

(21) Appl. No.: 16/294,455

(22) Filed: Mar. 6, 2019

(65) Prior Publication Data

US 2020/0012580 A1 Jan. 9, 2020

(30) Foreign Application Priority Data

Jul. 9, 2018 (JP) .................................. 2018-130284

(51) Int. Cl.
*G06F 3/06* (2006.01)
*G06F 11/30* (2006.01)
*G06F 11/34* (2006.01)

(52) U.S. Cl.
CPC ........ *G06F 11/3495* (2013.01); *G06F 3/0604* (2013.01); *G06F 3/0653* (2013.01); *G06F 3/0673* (2013.01); *G06F 11/3034* (2013.01)

(58) Field of Classification Search
CPC .. G06F 11/3495; G06F 3/0604; G06F 3/0653; G06F 3/0673; G06F 11/3034
See application file for complete search history.

(56) References Cited

U.S. PATENT DOCUMENTS

| | | | |
|---|---|---|---|
| 2005/0005038 A1* | 1/2005 | Ayukawa | ................ H04L 45/00 710/38 |
| 2006/0059303 A1* | 3/2006 | Takeda | .................... G06F 3/067 711/113 |

(Continued)

FOREIGN PATENT DOCUMENTS

JP 2007-207173 A 8/2007

*Primary Examiner* — Glenn Gossage
(74) *Attorney, Agent, or Firm* — Volpe Koenig

(57) ABSTRACT

A storage apparatus includes a controller unit and output unit. The controller receives cyclic information that is cycled within a specific group of storage apparatuses with properties close to a relevant storage apparatus. The cyclic information includes performance information of each storage apparatus in the specific group and evaluation information indicative of an evaluation result of the performance information of each storage apparatus. The controller acquires the performance information including the evaluation results, combines it with the cyclic information, and transmits the cyclic information to a storage apparatus which is a next cycling destination. A similarity level may be calculated based on configuration information and a predetermined weight. A specific group may be formed by checking whether storage apparatuses are capable of communicating with each other, so a cyclic path can be formed. The output unit may transmit performance information as information to be displayed on a user terminal.

9 Claims, 19 Drawing Sheets

(56) References Cited

U.S. PATENT DOCUMENTS

| | | | |
|---|---|---|---|
| 2007/0185990 A1 | 8/2007 | Ono et al. | |
| 2008/0270851 A1* | 10/2008 | Ochi | G06F 11/3466 |
| | | | 714/47.2 |
| 2009/0292789 A1* | 11/2009 | Nagai | H04L 41/0859 |
| | | | 709/213 |
| 2013/0166570 A1* | 6/2013 | Takada | G06F 16/245 |
| | | | 707/748 |
| 2016/0342358 A1* | 11/2016 | Otaka | G06F 11/1076 |
| 2017/0068625 A1* | 3/2017 | Kubota | G06F 13/1668 |
| 2020/0073578 A1* | 3/2020 | Maita | G06F 3/067 |

* cited by examiner

FIG.5

| APPA-RATUS ID | | PERFORMANCE VALUE | | | |
|---|---|---|---|---|---|
| | | PERFORMANCE INFORMATION TYPE 1 (MP USAGE RATE) | PERFORMANCE INFORMATION TYPE 2 (CACHE USAGE RATE) | PERFORMANCE INFORMATION TYPE 3 (PORT IOPS) | ... |
| A | MAXIMUM VALUE | 35 | 35 | 210 | |
| | MINIMUM VALUE | 5 | 5 | 160 | |
| B | MAXIMUM VALUE | 30 | 30 | 300 | |
| | MINIMUM VALUE | 10 | 5 | 100 | |
| C | MAXIMUM VALUE | 40 | 50 | 320 | |
| | MINIMUM VALUE | 15 | 10 | 120 | |
| ... | ... | ... | ... | ... | |

| TIME OF DAY | CONTENT |
|---|---|
| 2018/01/02 12:35:00 | LOAD BALANCING IS RECOMMENDED BECAUSE THERE IS DIFFERENCE IN MP USAGE RATE BETWEEN APPARATUSES B AND D. |
| 2018/01/01 22:33:44 | SPIKE IS DETECTED AT APPARATUS E REGARDING VOLUME IOPS. |
| 2017/12/31 01:23:45 | LOAD BALANCING IS RECOMMENDED BECAUSE THERE IS DIFFERENCE IN CACHE USAGE RATE BETWEEN APPARATUSES B AND E. |

PERFORMANCE INFORMATION TYPE 1 (MP USAGE RATE) 208

| APPA-RATUS ID | | PERFORMANCE VALUE HISTORY | | | |
|---|---|---|---|---|---|
| | | HISTORY 1 | HISTORY 2 | HISTORY 3 | ... |
| A | MAXIMUM VALUE | 35 | 35 | 37 | |
| | MINIMUM VALUE | 5 | 6 | 6 | |
| B | MAXIMUM VALUE | 30 | 30 | 35 | |
| | MINIMUM VALUE | 10 | 10 | 10 | |
| C | MAXIMUM VALUE | 40 | 42 | 40 | |
| | MINIMUM VALUE | 15 | 18 | 20 | |
| ... | ... | ... | ... | ... | |

PERFORMANCE INFORMATION TYPE X ...

| APPARATUS ID | IP ADDRESS |
|---|---|
| A | 1.2.3.4 |
| B | 1.2.3.5 |
| C | 1.2.3.6 |
| ... | ... |

| PERFORMANCE INFORMATION TYPE | FLAG |
|---|---|
| PERFORMANCE INFORMATION TYPE 1 (MP USAGE RATE) | TRUE |
| PERFORMANCE INFORMATION TYPE 2 (CACHE USAGE RATE) | TRUE |
| PERFORMANCE INFORMATION TYPE 3 (PORT IOPS) | FALSE |
| ... | ... |

| CONFIGURATION INFORMATION PROPERTY | WEIGHT |
|---|---|
| CONFIGURATION INFORMATION PROPERTY 1 (COINCIDENCE OF APPARATUS MODEL TYPES) | 7 |
| CONFIGURATION INFORMATION PROPERTY 2 (COINCIDENCE OF MOUNTED DRIVE TYPES) | 4 |
| CONFIGURATION INFORMATION PROPERTY 3 (COINCIDENCE OF MOUNTED PORT TYPES) | 0 |
| ... | |

| ITEM | VALUE |
|---|---|
| UPPER LIMIT OF INTRA-GROUP APPARATUS QUANTITY | 6 |
| LOWER LIMIT OF INTRA-GROUP APPARATUS QUANTITY | 4 |

| APPA-RATUS ID | CONFIGURATION CONTENT | | | ... |
|---|---|---|---|---|
| | APPARATUS MODEL | MOUNTED DRIVE TYPE | APPARATUS-AND-APPARATUS PAIR | |
| A | VSP G | SAS/SSD | A-B PAIR EXISTS | |
| B | VSP G | SAS/SSD | A-B PAIR EXISTS | |
| C | VSP F | SAS | NONE | |
| ... | | | | |

| APPA-RATUS ID | A | B | C | D | ... |
|---|---|---|---|---|---|
| A | -1 | 0.5 | -1 | -1 | |
| B | -1 | -1 | 0.2 | -1 | |
| C | 0.7 | 0.2 | -1 | -1 | |
| D | 0.2 | -1 | -1 | -1 | |
| ... | | | | | |

| APPA-RATUS ID | A | B | C | D | ... |
|---|---|---|---|---|---|
| A | 0 | 6 | 0 | 0 | |
| B | 0 | 0 | 8 | 0 | |
| C | 3 | 8 | 0 | 0 | |
| D | 4 | 0 | 0 | 0 | |
| ... | | | | | |

FIG.24

GROUPING SCREEN — 2400

ALL-APPARATUS INFORMATION INPUT — 2401

| APPARATUS A | IP ADDRESS : | 1. 2. 3. 4 |
|---|---|---|
| APPARATUS B | IP ADDRESS : | 1. 2. 3. 5 |
| ... | ... | |
| APPARATUS M | IP ADDRESS : | 1. 2. 3. 16 |
| APPARATUS N | IP ADDRESS : | 1. 2. 3. 17 |

ADD ROW — 2402

CONFIGURATION INFORMATION PROPERTY WEIGHTING INPUT — 2404

| COINCIDENCE OF APPARATUS MODEL TYPES | WEIGHT: 7 |
|---|---|
| COINCIDENCE OF MOUNTED DRIVE TYPES | WEIGHT: 4 |
| COINCIDENCE OF MOUNTED PORT TYPES | WEIGHT: 0 |
| WHETHER APPARATUS-AND-APPARATUS PAIR EXISTS OR NOT | WEIGHT: 2 |
| WHETHER APPARATUSES ARE COUPLED TO THE SAME HOST OR NOT | WEIGHT: 0 |

PERFORMANCE INFORMATION TYPE SELECTION — 2403

- ☒ MP USAGE RATE
- ☒ CACHE USAGE RATE
- ☒ CACHE WRITE WAITING RATE
- ☐ PORT IOPS
- ☐ PORT TRANSFER SPEED
- ☐ AVERAGE PORT RESPONSE TIME
- ☒ VOLUME IOPS
- ☒ VOLUME TRANSFER SPEED
- ☐ AVERAGE VOLUME RESPONSE TIME

UPPER LIMIT AND LOWER LIMIT INPUT — 2405

| UPPER LIMIT OF INTRA-GROUP APPARATUS QUANTITY: | 6 |
|---|---|
| LOWER LIMIT OF INTRA-GROUP APPARATUS QUANTITY: | 4 |

EXECUTE GROUPING — 2406

GROUPING RESULT DISPLAY — 2407

| GROUP ID | | RELAY ORDER | | | | | |
|---|---|---|---|---|---|---|---|
| | | 1 | 2 | 3 | 4 | 5 | 6 |
| 1 | APPARATUS ID | A | B | C | D | E | (RETURN TO A) |
| | RESPONSIBLE PERFORMANCE INFORMATION | MP USAGE RATE | CACHE USAGE RATE | CACHE WRITE WAITING RATE | VOLUME IOPS | VOLUME TRANSFER SPEED | |
| 2 | APPARATUS ID | F | G | H | I | J | (RETURN TO F) |
| | RESPONSIBLE PERFORMANCE INFORMATION | MP USAGE RATE | CACHE USAGE RATE | CACHE WRITE WAITING RATE | VOLUME IOPS | VOLUME TRANSFER SPEED | |
| 3 | APPARATUS ID | K | L | M | N | (RETURN TO K) | |
| | RESPONSIBLE PERFORMANCE INFORMATION | MP USAGE RATE, VOLUME TRANSFER SPEED | CACHE USAGE RATE | CACHE WRITE WAITING RATE | VOLUME IOPS | | |

START RELAYING PERFORMANCE INFORMATION — 2408

STORAGE APPARATUS, STORAGE SYSTEM, AND PERFORMANCE EVALUATION METHOD USING CYCLIC INFORMATION CYCLED WITHIN A GROUP OF STORAGE APPARATUSES

TECHNICAL FIELD

The present invention relates to a storage apparatus, a storage system, and a performance evaluation method.

BACKGROUND ART

Conventionally, a common method for detecting performance problems of a plurality of computers (such as storage apparatuses) is to detect the performance problems by using a management server to cause it to monitor each computer and collecting and analyzing various kinds of performance information.

In recent years, there have been disclosed performance analysis apparatuses capable of efficiently investigating peculiar nodes in terms of the performance in a cluster system (see PTL 1).

CITATION LIST

Patent Literature

PTL 1: Japanese Patent Application Laid-Open (Kokai) Publication No. 2007-207173

SUMMARY OF THE INVENTION

Problems to be Solved by the Invention

Since the technology disclosed in PTL 1 uses the management server to detect the performance problems, it has problems such that a large-scale computer system requires large-capacity storage areas for storing the collected performance information and it requires time to detect the performance problems in order to use an enormous amount of the performance information as a processing target.

The present invention was devised in consideration of the above-described circumstances and aims at, for example, properly detecting problems relating to the performance of the storage apparatuses.

Means to Solve the Problems

In order to solve the above-described problems, provided according to an aspect of the present invention is a storage apparatus including a control unit and an output unit. The control unit receives cyclic information that is cycled within a specific group in which storage apparatuses with properties close to a property of the storage apparatus are classified, the cyclic information including performance information of each storage apparatus belonging to the specific group and evaluation information indicative of an evaluation result of the performance information of each storage apparatus. The control unit acquires the performance information of the storage apparatus, causes the acquired performance information to be included in the cyclic information, causes a result of evaluation of the performance information of each storage apparatus with respect to a specified evaluation index to be included in the cyclic information, and transmits the cyclic information to a storage apparatus which is a next cycling destination. The output unit outputs at least one of the performance information included in the cyclic information and the evaluation information included in the cyclic information.

According to the above-described configuration, for example, the cyclic information including the performance information of each storage apparatus belong to the relevant group is cycled in each group and the specified evaluation index is evaluated by each storage apparatus, so that the management server for detecting problems relating to the performance is no longer required. Furthermore, for example, storage apparatuses with close properties are classified into each group, so that a relative comparison can be performed by using the performance information of the storage apparatuses with the close properties; and even if the amount of the performance information is small, the problems relating to the performance of each storage apparatus can be detected. Furthermore, according to the above-described configuration, the problems relating to the performance of the storage apparatuses can be detected properly. Furthermore, since the cyclic information is output in the above-described configuration, the user can correct the problems relating to the performance of the storage apparatuses by, for example, checking at least one of the performance information and the evaluation information included in the cyclic information.

Advantageous Effects of the Invention

A highly reliable storage system can be realized according to the present invention.

BRIEF DESCRIPTION OF DRAWINGS

FIG. 5 is a diagram illustrating an example of a performance information relay table;

FIG. 6 is a diagram illustrating an example of a notice information table;

FIG. 7 is a diagram illustrating an example of a performance information retaining table;

FIG. 8 is a diagram illustrating an example of an all-apparatus information table;

FIG. 9 is a diagram illustrating an example of a performance information type selection table;

FIG. 10 is a diagram illustrating an example of a configuration information property weighting table;

FIG. 11 is a diagram illustrating an example of an intra-group apparatus quantity information table;

FIG. 12 is a diagram illustrating an example of a configuration information table;

FIG. 13 is a diagram illustrating an example of an inter-apparatus communication information table;

FIG. 14 is a diagram illustrating an example of a similarity level table;

FIG. 24 is a diagram illustrating an example of a grouping screen;

DESCRIPTION OF EMBODIMENTS

An embodiment of the present invention will be described below in detail with reference to the drawings.

(1) First Embodiment

Figure 1:
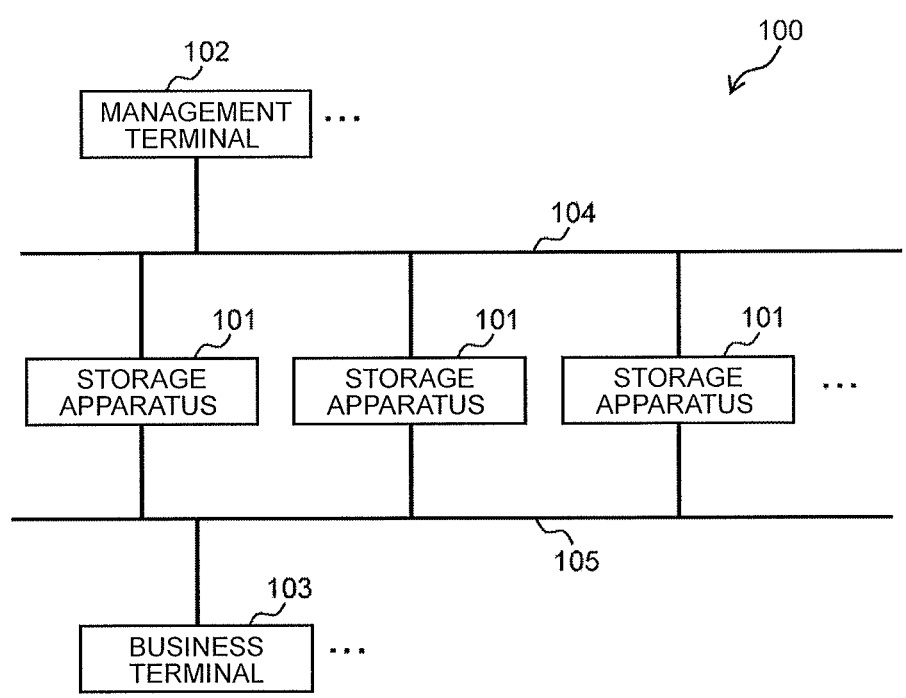
FIG. 1 is a diagram illustrating an example of the configuration of a storage system.

Referring to FIG. 1, the reference number 100 represents a storage system according to a first embodiment as a whole. Regarding the storage system 100, a plurality of storage apparatuses 101 are divided into one or more groups and the storage apparatuses 101 are managed (by means of, for example, collection, accumulation, and analysis of performance information) within each group. Incidentally, a management server for managing the storage apparatuses 101 is not provided in the storage system 100.

The performance information is information indicative of the performance of a storage apparatus 101. The performance information is not limited. For example, arbitrary metric information such as an MP (Microprocessor) usage rate, a cache usage rate, a cache write waiting rate, a port IOPS (Input/Output Per Second), a port transfer speed, average port response time, a volume IOPS, a volume transfer speed, and average volume response time can be adopted as the performance information.

Referring to FIG. 1, the storage system 100 is configured by including a plurality of storage apparatuses 101, one or more management terminals 102 used by an administrator (or a user) of the storage apparatuses 101, and one or more business terminals 103 used by the user of the storage apparatuses 101.

The storage apparatuses 101 and the management terminal(s) 102 are coupled to each other via a network 104 (for example, a LAN [Local Area Network]). The storage apparatuses 101 and the business terminal(s) 103 are coupled to each other via a network 105 (such as a LAN or a SAN [Storage Area Network]). Incidentally, the network 104 and the network 105 may be the same network or mutually independent networks.

Characteristic processing of the storage system 100 is as described below. Incidentally, the details of each processing will be described later with reference to, for example, FIG. 15 to FIG. 23.

(Grouping Processing)

A storage apparatus 101 designated by the user (hereinafter referred to as the "master") executes processing for forming a group by gathering a plurality of storage apparatuses 101 with close properties.

(Performance Information Relay Processing)

The storage apparatus 101 executes processing for relaying (or cycling), for example, the latest performance information within the group.

(Performance Information Display Processing)

The storage apparatus 101 executes processing for displaying, for example, the performance information in response to a request from the management terminal 102.

Figure 2:
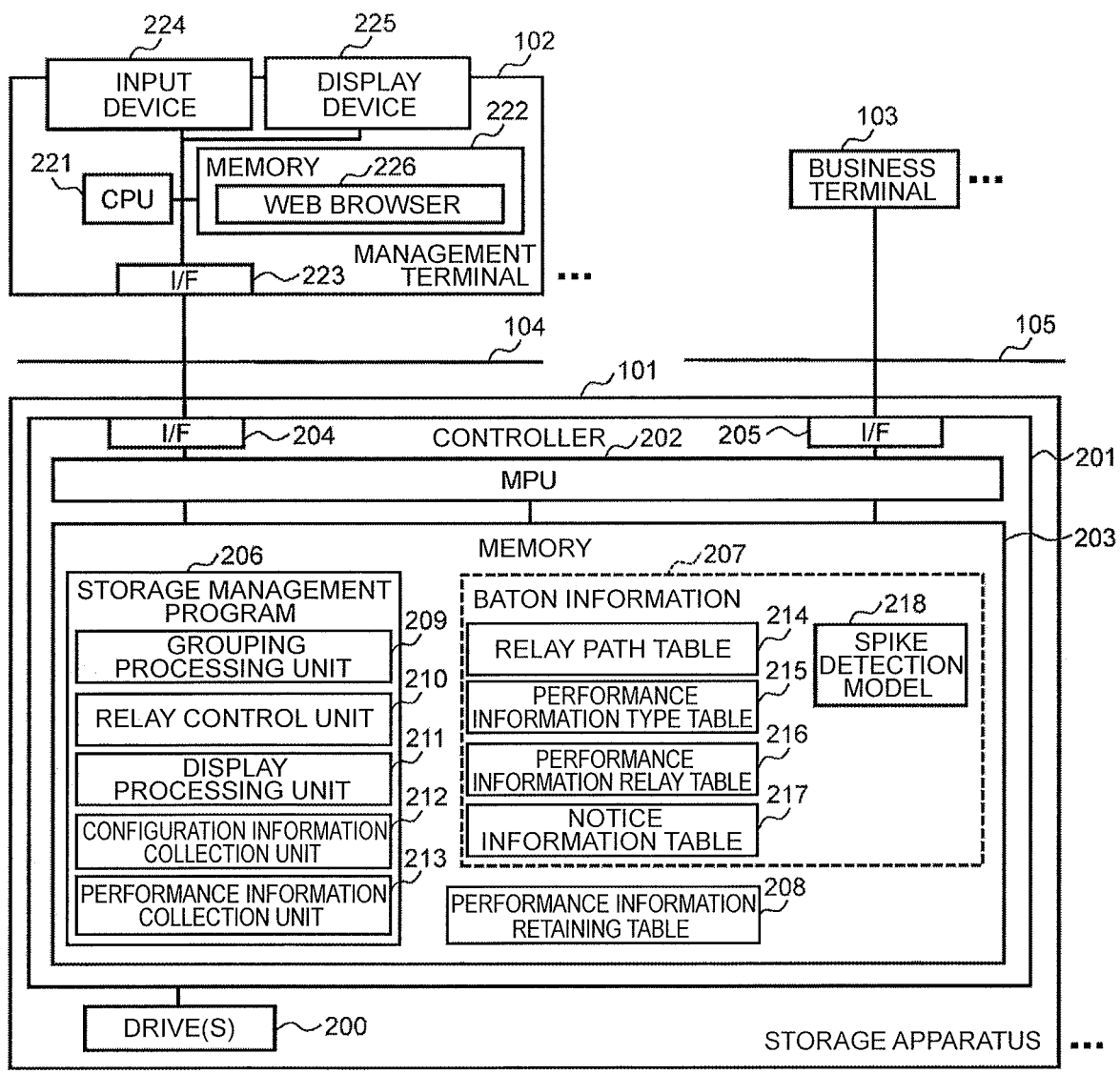
FIG. 2 is a diagram illustrating an example of a hardware configuration and software configuration of the storage system.

FIG. 2 is a diagram illustrating an example of a hardware configuration and software configuration of the storage system 100. The storage apparatus 101 includes a drive(s) 200 for storing data and a controller 201 for executing processing as illustrated in FIG. 2.

The drive 200 is a nonvolatile storage device. The drive 200 is, for example, a semiconductor memory device such as a magnetic disk or an SSD (Solid State Drive). Incidentally, two or more drives 200 may be provided. An example of information which realizes this configuration is a RAID (Redundant Array of Inexpensive Disks) where, for example, enhancement of reliability by data redundancy and performance enhancement by parallel operation of the drives 200 can be expected by using a plurality of drives 200. Incidentally, regarding the storage apparatus 101, the controller 201 may provide the business terminal 103 with one or more logical volumes composed of physical storage areas of the drive(s) 200.

The controller 201 is configured by including an MPU (Micro-Processing Unit) 202, a memory 203, an I/F (interface) 204 to be coupled to the management terminal 102 in a manner capable of communication with the management terminal 102, and an I/F 205 to be coupled to the business terminal 103 in a manner capable of communication with the business terminal 103. The respective components 202 to 205 are coupled to each other via an internal network.

The MPU 202 is an arithmetic operation unit or control unit for executing programs in the memory 203 and executes various processing in accordance with commands. Incidentally, regarding processing executed by the MPU 202 by executing a program in the memory 203, this embodiment may sometimes describe the storage apparatus 101 or the controller 201 as a subject of the processing. The memory 203 is, for example, a volatile storage device and stores various kinds of information (such as a storage management program 206, baton information 207, a performance information retaining table 208, and tables to be temporarily used). The memory 203 may be a storage unit for storing data. The I/F 204 is coupled to the management terminal 102 via the network 104 and executes processing for transmitting/receiving commands, data, and so on to/from the management terminal 102. The I/F 205 is coupled to the business terminal 103 via the network 105 and executes processing for transmitting/receiving commands, data, and so on to/from the business terminal 103.

Functions of the storage apparatus 101 (such as the storage management program 206) may be implemented by software (for example, the MPU 202 by reading programs into the memory 203 and executing them) or may be implemented by hardware such as a dedicated circuit or may be implemented by a combination of the software and the hardware. Furthermore, some of the functions of the storage apparatus 101 may be implemented by another computer capable of communicating with the storage apparatus 101.

The storage management program 206 includes a grouping processing unit 209, a relay control unit 210, a display processing unit 211, a configuration information collection unit 212, and a performance information collection unit 213.

The grouping processing unit 209 forms a group by calculating a similarity level of all combinations two storage apparatuses 101 among the plurality of storage apparatuses 101 based on a configuration information table 1200 described later, and a configuration information property weighting table 1000 described later and searching for a grouping based on the calculated similarity level so that the storage apparatuses 101 with close properties will be gathered in the same group. Incidentally, the grouping processing unit 209 will be described later with reference to, for example, FIG. 16 to FIG. 19.

When the relay control unit 210 receives the baton information 207 that is relayed within a specific group in which the relevant storage apparatus 101 (its own storage apparatus) and the storage apparatuses 101 with close properties are classified, the relay control unit 210 acquires its own performance information, causes the acquired performance information to be included in the baton information 207, causes an analysis result of the performance information of each storage apparatus with respect to a specified performance information type to be included in the baton information 207, and transmits the baton information 207 to a storage apparatus 101 which is the next cycling destination. Incidentally, the relay control unit 210 will be described later with reference to, for example, FIG. 20 to FIG. 22.

The display processing unit 211 causes the management terminal 102 to display at least one of a performance information relay table 216 and a notice information table 217 which are included in the baton information 207. Incidentally, the display processing unit 211 will be described later with reference to, for example, FIG. 23. The configuration information collection unit 212 collects configuration information of the storage apparatuses 101. The performance information collection unit 213 collects performance information of the storage apparatuses 101.

Under this circumstance, the baton information 207 includes the performance information of each storage apparatus 101 belonging to the specific group (the performance information relay table 216 described later) and the analysis result information of the performance information of each storage apparatus 101 (for example, the notice information table 217 described later). In this embodiment, the baton information 207 is configured by including a relay path table 214, a performance information type table 215, the performance information relay table 216, the notice information table 217, and a spike detection model 218. Incidentally, the respective tables 214 to 217 will be described later with reference to FIG. 3 to FIG. 6. Furthermore, the performance information retaining table 208 will be described later with reference to FIG. 7.

The spike detection model 218 is a machine learning model which has learned information about spikes (phenomena of instant rises or falls) in advance that may adversely affect the performance of the storage apparatus(es) 101. The spike detection model 218 is configured by including a plurality of parameters for detecting the spike(s).

The management terminal 102 is a physical computer and is, for example, a notebook computer or a tablet terminal. The management terminal 102 is configured by including a CPU (Central Processing Unit) 221, a memory 222, an I/F 223, an input device 224, and a display device 225. Incidentally, the management terminal 102 may be a virtual computer that operates on the physical computer.

The CPU 221 is an arithmetic operation unit or control unit for executing programs in the memory 222 and executes various kinds of processing in accordance with commands. Incidentally, regarding processing executed by the CPU 221 by executing a program in the memory 222, this embodiment may sometimes describe the management terminal 102 as a subject of the processing. The memory 222 is, for example, a volatile storage device. The memory 222 may be a storage unit for storing data. The I/F 223 is, for example, an NIC (Network Interface Card), is coupled to the storage apparatus 101 via the network 104, and executes processing for transmitting/receiving commands, data, and so on to/from the storage apparatus 101. The input device 224 is, for example, a keyboard and a pointing device and inputs various kinds of information. The display device 225 is, for example, a display and displays various kinds of information. Incidentally, the display device 225 is an example of an output device for outputting various kinds of information. Furthermore, the management terminal 102 is an example of the output device.

Functions of the management terminal 102 (such as a WEB [World Wide Web] browser 226) may be implemented by, for example, the CPU 221 by reading programs into the memory 222 and executing them (by means of software) or may be implemented by hardware such as a dedicated circuit or may be implemented by a combination of the software and the hardware. Furthermore, some of the functions of the management terminal 102 may be implemented by another computer capable of communicating with the management terminal 102.

The web browser 226 is application software for browsing WEB pages. The web browser 226: requests that a storage apparatus 101 designated by the user should transmit data; reads HTML (Hyper Text Markup Language) files, image files, and so on which are returned from that storage apparatus 101; and displays them on the display device 225 in a designated layout. Settings relating to grouping processing and displaying relating to performance information display processing are performed via the web browser 226.

The business terminal 103 is a physical computer including a CPU and a memory or a virtual computer that operates on the physical computer. The business terminal 103 stores at least part of data, which are necessary for a service(es) provided by the business terminal 103, in the storage apparatus 101. The business terminal 103 reads/writes data stored in the storage apparatus 101 by transmitting a data access request to the storage apparatus 101. For example, a read command or a write command according to the SCSI (Small Computer System Interface) standards is used as the data access request. The data access request is also called an I/O (Input/Output) request.

Figure 3:
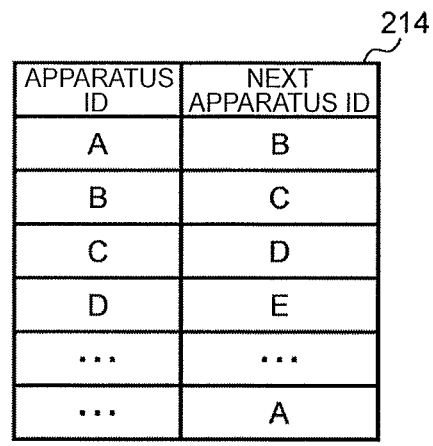
FIG. 3 is a diagram illustrating an example of a relay path table.

FIG. 3 is a diagram illustrating an example of the relay path table 214. The relay path table 214 is a table that stores information indicating a path for each storage apparatus 101 in the group to relay the baton information 207 (relay path information).

The relay path table 214 stores, for example, information about an apparatus ID (identification) and a next apparatus ID by associating them with each other. The apparatus ID is identification information capable of identifying the relevant storage apparatus 101. The next apparatus ID is identification information capable of identifying a storage apparatus 101 to which the baton information 207 is transmitted. A top record of the relay path table 214 indicates that a storage apparatus 101 whose apparatus ID is "A" transmits the baton information 207 to a storage apparatus 101 whose apparatus ID is "B."

In the following description, the storage apparatus 101 with the apparatus ID "A" is expressed as storage apparatus A; the storage apparatus 101 with the apparatus ID "B" is expressed as storage apparatus B; a storage apparatus 101 with the apparatus ID "C" is expressed as storage apparatus C; a storage apparatus 101 with the apparatus ID "D" is expressed as storage apparatus D; and a storage apparatus 101 with the apparatus ID "E" is expressed as storage apparatus E.

Incidentally, the relay path information is not limited to the example in FIG. 3 and may be, for example, a list of apparatus IDs "A, B, C, D, E" or information of other formats capable of identifying a path for relaying the baton information 207.

Figure 4:
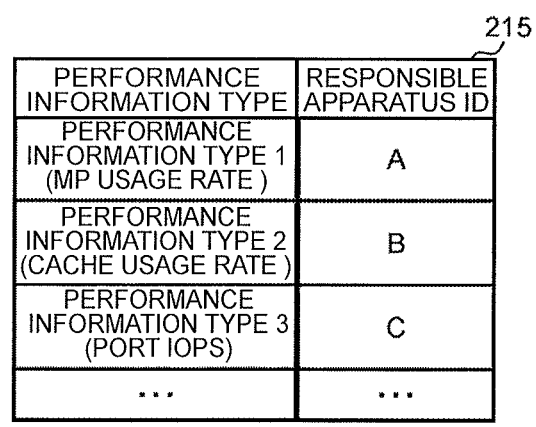
FIG. 4 is a diagram illustrating an example of a performance information type table.

FIG. 4 is a diagram illustrating an example of the performance information type table 215. The performance information type table 215 is a table for storing information to recognize performance information types regarding which the respective storage apparatuses 101 are responsible for their analysis.

The performance information type table 215 stores, for example, information about a performance information type and a responsible apparatus ID by associating them with each other. The performance information type is a type of the performance information designated by the user. The responsible apparatus ID is identification information capable of identifying a storage apparatus 101 allocated to the performance information type.

A top record of the performance information type table 215 indicates that storage apparatus A is responsible for the performance information type "Performance Information Type 1 (MP usage rate)."

FIG. 5 is a diagram illustrating an example of the performance information relay table 216. The performance information relay table 216 is a table for storing the latest performance information (performance values such as maximum values and minimum values) when the storage apparatus 101 receives the baton information 207.

The performance information relay table 216 stores, for example, information about an apparatus ID and the performance values by associating them with each other. The performance values are the maximum value and the minimum value for each performance information type. Incidentally, the performance values are not limited to the maximum value and the minimum value, but may be, for example, the most recent value, a median value, or an average value.

A top record of the performance information relay table 216 shows that when storage apparatus A receives the baton information 207, for example, the maximum value "35" and the minimum value "5" of the MP usage rate, the maximum value "35" and the minimum value "5" of the cache usage rate, and the maximum value "210" and the minimum value "160" of the Port IOPS are acquired and stored.

FIG. 6 is a diagram illustrating an example of the notice information table 217. The notice information table 217 is a table for storing information relating to notification generated based on the performance information of the performance information type for which each storage apparatus 101 is responsible (such as information relating to a detection of spikes and information relating to a recommendation of load balancing).

The notice information table 217 stores, for example, information about time of day and content by associating them with each other. The time of day indicates the time of day when a problem of the performance (such as a spike or load imbalance) is detected. The content indicates the content (content of notification) indicating the problem of the performance detected by the storage apparatus 101.

The following messages are provided as the content of notification: an alert message indicating that a spike has been detected; and a recommendation message to recommend the load balancing to correct the load imbalance.

FIG. 7 is a diagram illustrating an example of the performance information retaining table 208. The performance information retaining table 208 is provided for each performance information type. The storage apparatus 101 stores (or retains) the performance information retaining table 208 of a performance information type regarding which the storage apparatus 101 is responsible for its analysis.

The performance information retaining table 208 is a table for retaining (or accumulating) performance values. The performance information retaining table 208 stores, for example, information about the apparatus ID and histories of the performance values by associating them with each other. The histories of the performance values indicate the performance values as many as a specified number of times.

For example, when a storage apparatus 101 which is responsible for the "MP usage rate" as the performance information type receives the baton information 207, it stores performance values of the MP usage rate of all the storage apparatuses 101 in the performance information relay table 216 as the latest history "History 1" in the performance information retaining table 208.

FIG. 8 is a diagram illustrating an example of an all-apparatus information table 800. The all-apparatus information table 800 is a table for temporarily storing information (all-apparatus information) about the storage apparatuses 101 which are set on a grouping screen described later with reference to FIG. 24.

The all-apparatus information table 800 stores, for example, information about the apparatus ID and an IP (Internet Protocol) address by associating them with each other. A top record of the all-apparatus information table 800 indicates that the IP address of storage apparatus A is "1.2.3.4." Incidentally, identification information for identifying the storage apparatus 101 is not limited to the IP address and may be other identification information.

FIG. 9 is a diagram illustrating an example of a performance information type selection table 900. The performance information type selection table 900 is a table for temporarily storing information about the performance information type selected on the grouping screen described later (performance information type selection information).

The performance information type selection table 900 stores, for example, information about the performance information type and a flag by associating them with each other. The flag is an identifier indicating whether the performance information type has been selected or not. When the flag is "True," it indicates that the performance information type has been selected; and when the flag is "False," it indicates that the performance information type has not been selected.

Since a top record of the performance information type selection table 900 shows that the flag for the MP usage rate is "True," it indicates that the MP usage rate has been selected as the performance information type.

FIG. 10 is a diagram illustrating an example of a configuration information property weighting table 1000. The configuration information property weighting table 1000 is a table for temporarily storing information indicative of weights for properties of the configurations of the storage apparatuses which are set on the grouping screen described below (configuration information property weighting information).

The configuration information property weighting table 1000 stores, for example, information about configuration information properties and weights by associating them with each other. The configuration information properties are, for example, coincidence of model types of two storage apparatuses 101 (coincidence of the apparatus model types), coincidence of types of the drives 200 mounted in the two storage apparatuses 101 (coincidence of the mounted drive types), coincidence of types of ports mounted in the two storage apparatuses 101 (coincidence of the mounted port types), whether a pair of storage apparatuses 101 exists or not (whether the apparatus-and-apparatus pair exists or not), and whether two storage apparatuses 101 are coupled to the same business terminal 103 or not (whether the apparatuses are coupled to the same host or not). Incidentally, whether the apparatus-and-apparatus pair exists or not indicates whether or not a backup setting is set between the storage apparatuses 101.

A top record of the configuration information property weighting table 1000 indicates that when the apparatus model types of the two storage apparatuses 101 match each other, the weight "7" is assigned.

FIG. 11 is a diagram illustrating an example of an intra-group apparatus quantity information table 1100. The intra-group apparatus quantity information table 1100 is a table for temporarily storing information to define the number of storage apparatuses 101 in a group which is set on the grouping screen described later (intra-group apparatus quantity information).

The intra-group apparatus quantity information table 1100 stores, for example, information about items (an upper limit and a lower limit of the storage apparatuses 101 within the group) and values (an upper limit value and a lower limit value) by associating them with each other.

FIG. 12 is a diagram illustrating an example of a configuration information table 1200. The configuration information table 1200 is a table for temporarily storing configuration content collected by the master from each storage apparatus 101 based on its IP address (configuration information).

The configuration information table 1200 stores, for example, information about the apparatus ID and the configuration content by associating them with each other. The configuration content indicates the content relating to the configuration mounted in the relevant storage apparatus 101, that is, information such as the model of the storage apparatus 101, the drive 200 mounted in the storage apparatus 101, the port of the I/F 205 mounted in the storage apparatus 101 (not shown in FIG. 12), and whether an apparatus pair of the storage apparatus 101 exists. Additionally, this example shows that regarding the apparatus-and-apparatus pair, information about one apparatus-and-apparatus pair is stored, but information of a plurality of apparatus-and-apparatus pairs may sometimes be stored.

FIG. 13 is a diagram illustrating an example of an inter-apparatus communication information table 1300. The inter-apparatus communication information table 1300 is a table for temporarily storing information relating to communication between the storage apparatuses 101 (inter-apparatus communication information). The inter-apparatus communication information table 1300 stores, for example, information about the apparatus ID and communication time by associating them with each other.

For example, the master transmits the IP address of storage apparatus B to storage apparatus A, causes storage apparatus A to execute a communication test with storage apparatus B, and acquires a result of the communication test (the communication time between A and B, that is, "0.5" in this example). Incidentally, since settings of a communication path from storage apparatus A to storage apparatus B (such as a shortcut path or a circuitous path) and a network relating to the communication from storage apparatus A to storage apparatus B (for example, the network may be set to permit communications only in a certain direction) may be different, the master also acquires the communication time required for communication from storage apparatus B to storage apparatus A (the communication time between B and A).

Incidentally, the communication time "−1" is set when the communication failed or when a communication source and a communication destination are the same.

FIG. 14 is a diagram illustrating an example of a similarity level table 1400. The similarity level table 1400 is a table for temporarily storing a similarity level of two storage apparatuses 101. The similarity level table 1400 stores, for example, information about the apparatus ID and the similarity level by associating them with each other.

The similarity level is used when a relay path can be formed by grouping processing and in order to group storage apparatuses 101 with close properties into the same group. The similarity level is calculated based on the weights in the configuration information property weighting table 1000, the configuration information in the configuration information table 1200, and the inter-apparatus communication information in the inter-apparatus communication information table 1300.

For example, when communication from storage apparatus A to storage apparatus C is possible, the master sets "1" to the similarity level; and when such communication is impossible, the master sets "0" to the similarity level. When the communication is possible, the master further compares the "apparatus model type" which is the configuration information of storage apparatus A with the "apparatus model type" which is the configuration information of storage apparatus C; and when these "apparatus model types" match each other, the master adds the weight "7" for the "apparatus model type," which is the configuration information, to the similarity level; and when these "apparatus model types" do not match each other, the master adds "0" to the similarity level. The calculation is performed in the same manner regarding other configuration information and the mater calculates the similarity level between storage apparatus A and storage apparatus C.

The similarity level table 1400 shows, for example, that the similarity level between storage apparatuses A and C in consideration of the communication from storage apparatus A to storage apparatus C is "0" (which means that the communication is impossible and no relay path can be formed). Incidentally, regarding storage apparatuses C and A in consideration of the communication from storage apparatus C to storage apparatus A, their similarity level is "3" which indicates that a relay path can be formed.

Figure 15:
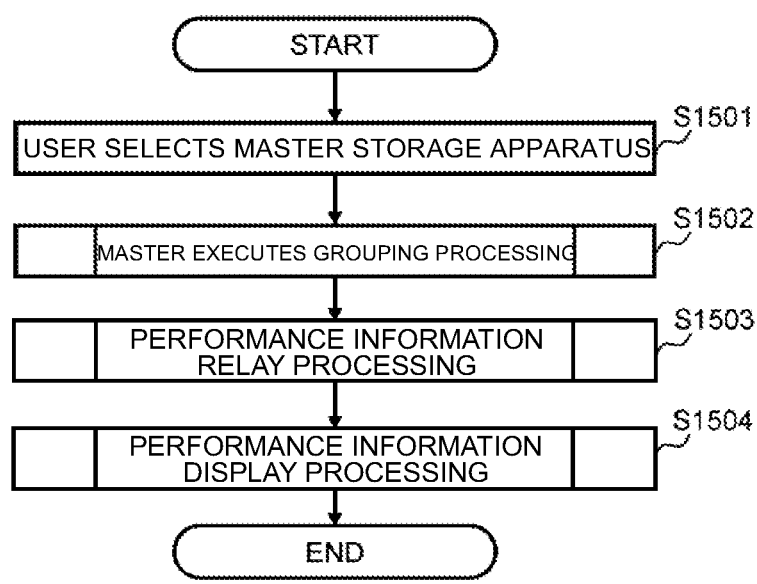
FIG. 15 is a diagram illustrating an example of a processing sequence relating to the entire processing of the storage system.

FIG. 15 is a diagram illustrating an example of a processing sequence for the entire processing of the storage system 100.

The user selects the master (step S1501). Firstly, the user selects one storage apparatus 101 from among the plurality of storage apparatuses 101 via the web browser 226. Incidentally, a storage apparatus 101 capable of accessing all the storage apparatuses 101 is selected as the master.

The master executes the grouping processing based on an instruction from the web browser 226 (step S1502). Regarding the grouping processing, for example, the user inputs a necessary parameter(s) for the group processing via the web browser 226. Then, the user gives the instruction to the master via the web browser 226 to start the grouping processing. The master transmits the result of the grouping processing to the web browser 226. When the user judges via the web browser 226 that there is no problem with the result of the grouping processing, the user gives an instruction to the master to start relay processing. Incidentally, the grouping processing will be described later with reference to FIG. 16 to FIG. 19.

After the grouping processing has been executed, performance information relay processing is executed on each group (step S1503). During the performance information relay processing, the performance information, recommendation messages, and alert messages are autonomously relayed in each group. Incidentally, the performance information relay processing will be described later with reference to FIG. 20 to FIG. 22.

Each storage apparatus 101 executes performance information display processing (step S1504). The user accesses an arbitrary storage apparatus 101 via the web browser 226 at an arbitrary timing and checks the performance information of each storage apparatus 101 in a group, to which the relevant storage apparatus 101 belongs, and recommendation messages and alert messages which are shared within the group. Furthermore, during the performance information display processing, the performance information, the recommendation messages, and the alert messages of each storage apparatus 101 within the group are displayed at certain intervals. Incidentally, the performance information display processing will be described later with reference to FIG. 23.

Figure 16:
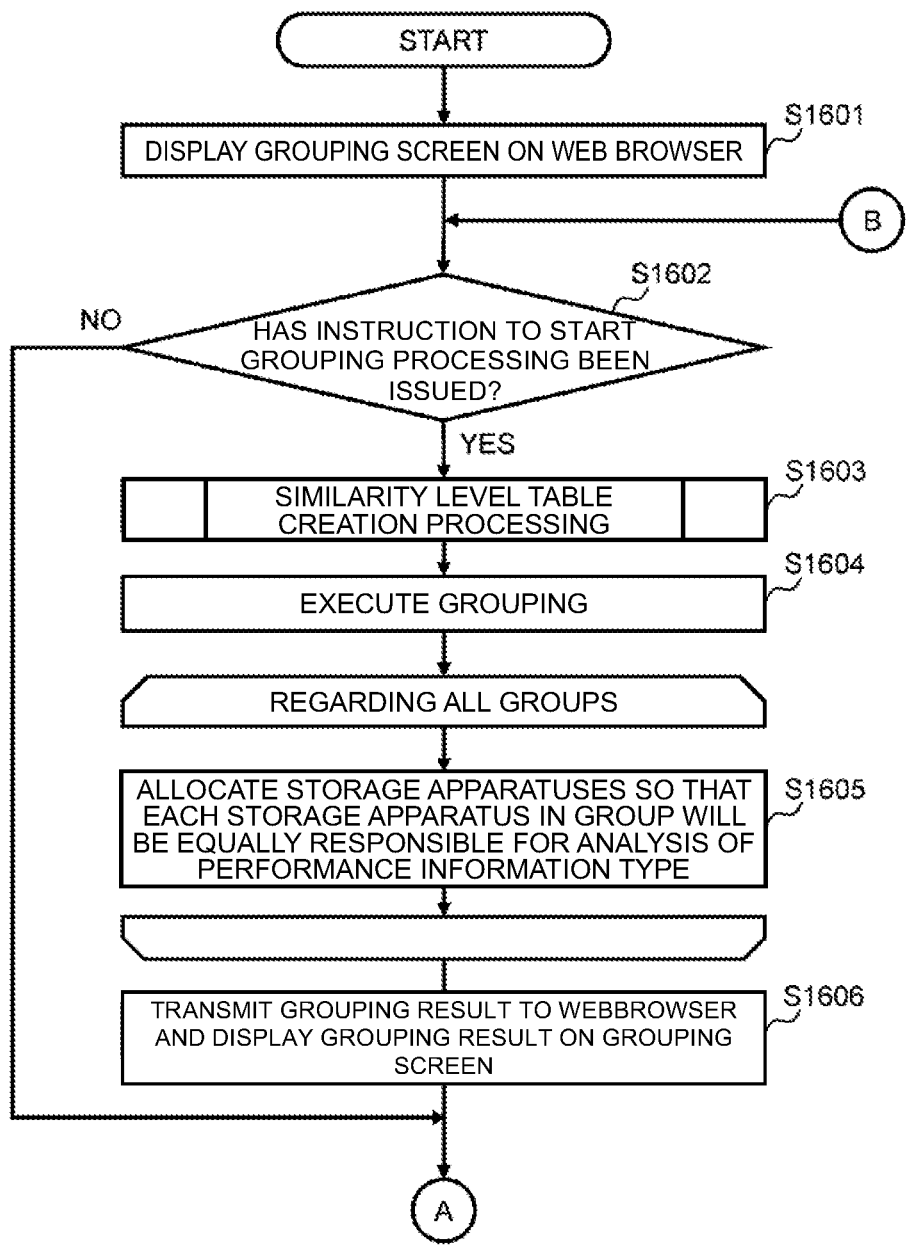
FIGS. 16 and 17 together illustrate an example of a processing sequence for grouping processing.
Figure 17:
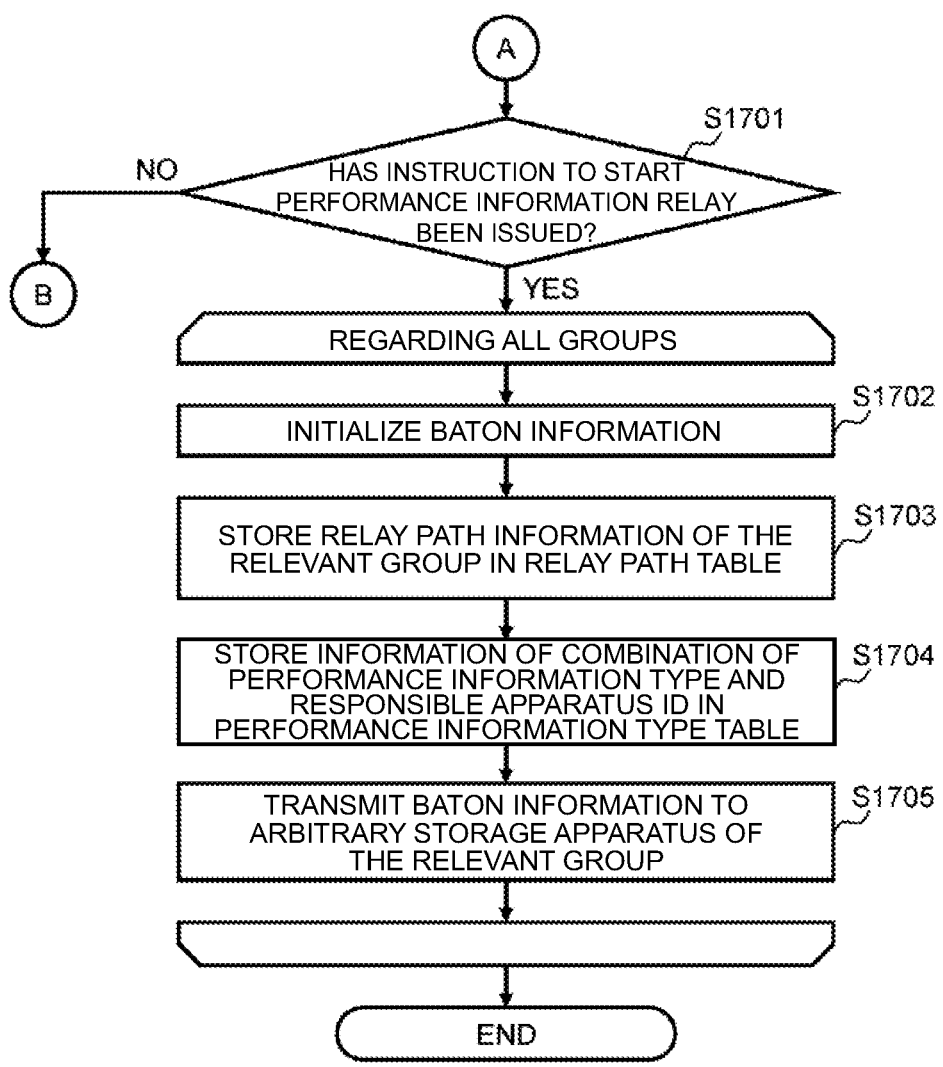

FIG. 16 and FIG. 17 are diagrams illustrating an example of the processing sequence for the grouping processing executed by the master.

The grouping processing unit 209 (FIG. 2) of the master transmits information of the grouping screen (HTML file) to the web browser 226 and causes the web browser 226 to display the grouping screen (FIG. 16, step S1601). Incidentally, the grouping screen will be described with reference to FIG. 24.

Subsequently, the grouping processing unit 209 judges whether the instruction to start the grouping processing has been issued or not (for example, whether a button to start the grouping processing (a grouping execution button) has been pressed or not) (step S1602). When the grouping processing unit 209 determines that the instruction to start the grouping processing has been issued, the processing proceeds to step S1603; and when the grouping processing unit 209 determines that the instruction to start the grouping processing has not been issued, the processing proceeds to step S1701.

In step S1603, the grouping processing unit 209 executes similarity level table creation processing. The similarity level table creation processing is to create the similarity level table 1400. Incidentally, the similarity level table creation processing will be described later with reference to FIG. 18 and FIG. 19.

Then, the grouping processing unit 209 executes grouping (step S1604). More specifically, the grouping processing unit 209 searches for a grouping so that a relay path can be created within each group by using the information of the similarity level table 1400, and a total value of similarity levels between the storage apparatus 101 of the relay path will become as high as possible, and the number of the storage apparatuses 101 within each group will be within the range specified by the lower limit and the upper limit (that is, the grouping processing unit 209 forms a group and generates the relay path for that group). An example of the grouping will be described later with reference to FIG. 25.

Subsequently, the grouping processing unit 209 executes processing of step S1605 with respect to or regarding all groups.

In step S1605, the grouping processing unit 209 allocates each storage apparatus 101 so that each storage apparatus 101 in the group will be equally responsible for analysis of the performance information type with the flag "True" in the performance information type selection table 900 (the grouping processing unit 209 decides a combination of the performance information type and a responsible apparatus ID).

Then, the grouping processing unit 209 transmits the grouping result to the web browser 226 and causes the web browser 226 to display the grouping screen (for example, the grouping result and a button to start the performance information relay processing (a performance information relay start button)).

Subsequently, the grouping processing unit 209 judges whether an instruction to start the performance information relay processing has been issued or not (for example, whether the performance information relay start button has been pressed or not) (FIG. 17, step S1701). When the grouping processing unit 209 determines that the instruction to start the performance information relay processing has been issued, the processing proceeds to step S1702; and when the grouping processing unit 209 determines that the instruction to start the performance information relay processing has not been issued, the processing proceeds to step S1602 (FIG. 16).

Incidentally, when the grouping result is displayed on the web browser 226 (between step S1606 and step S1701), a processing (or judgment) may be performed to check with the user to confirm whether the groups are formed as expected or not.

Then, the grouping processing unit 209 executes processing of step S1702 to step S1705 with respect to or regarding all the groups.

In step S1702, the grouping processing unit 209 initializes the baton information 207. For example, the grouping processing unit 209 initializes the relay path table 214, the performance information type table 215, the performance information relay table 216, the notice information table 217, and the spike detection model 218.

Then, the grouping processing unit 209 stores information about the relay path for the relevant group, which was determined in step S1604, in the relay path table 214 (step S1703).

Then, the grouping processing unit 209 stores information about the combination(s) of the performance information type and the responsible apparatus ID, which was determined in step S1605, in the performance information type table 215 (step S1704).

Subsequently, the grouping processing unit 209 transmits the baton information 207 to one arbitrary storage apparatus 101 belonging to the relevant group (step S1705).

After executing the processing from step S1702 to step S1705 with respect to all the groups, the grouping processing unit 209 terminates the grouping processing.

Figure 18:
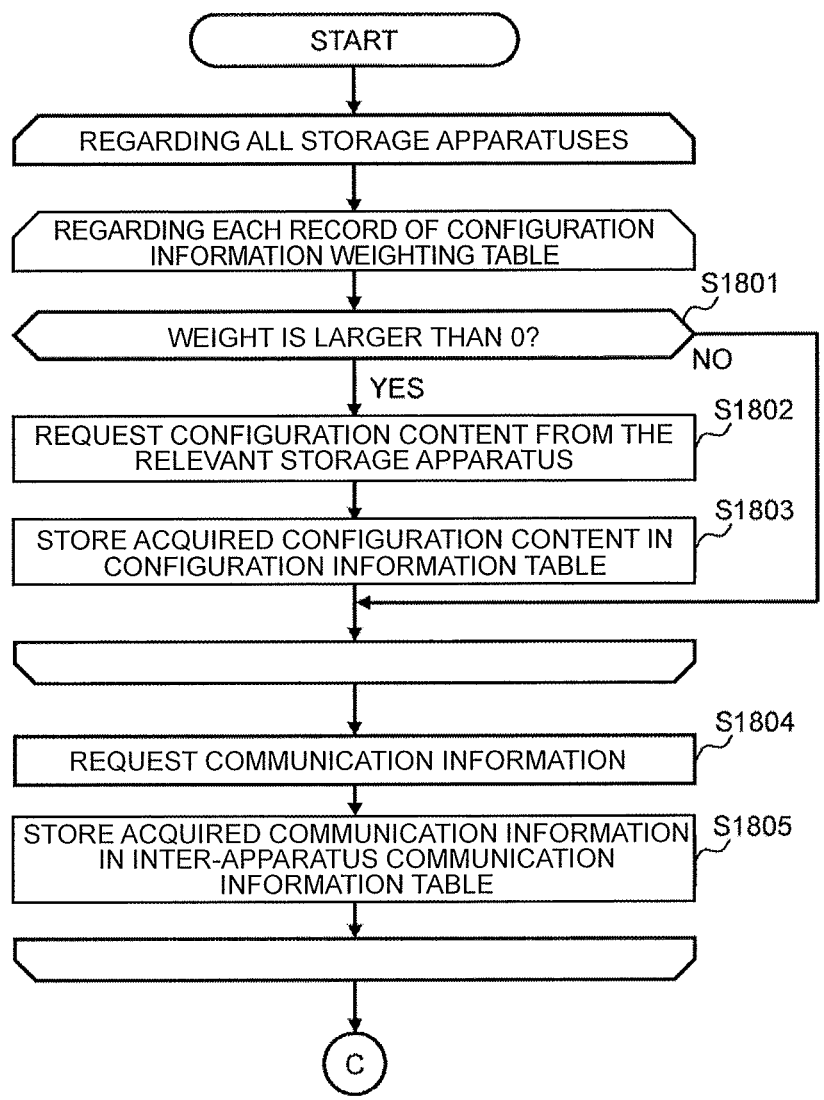
FIGS. 18 and 19 together illustrate an example of a processing sequence for similarity level table creation processing.
Figure 19:
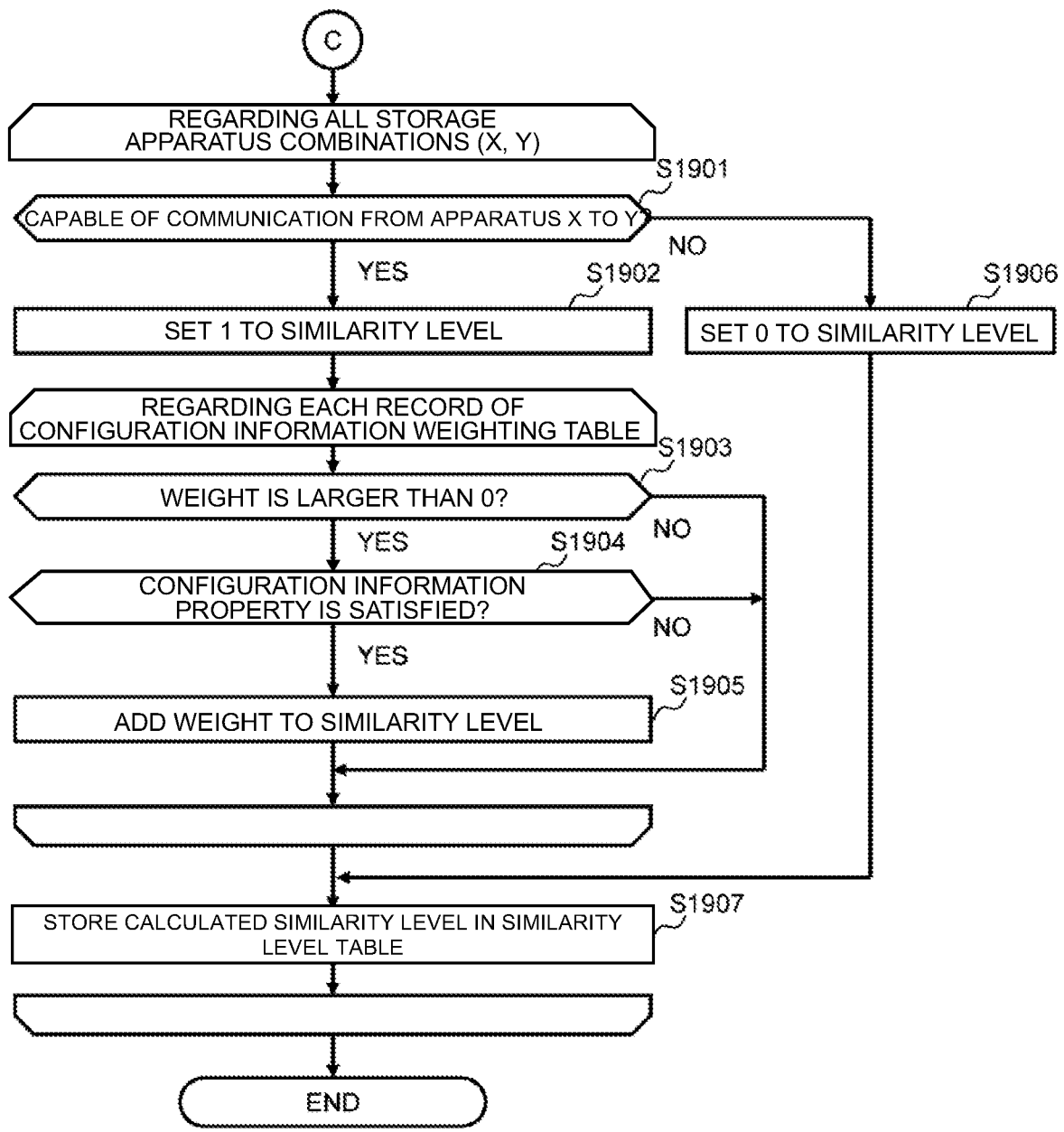

FIG. 18 and FIG. 19 are diagrams illustrating an example of the processing sequence for the similarity level table creation processing.

The grouping processing unit 209 executes processing of step S1801 to step S1805 (FIG. 18) with respect to all the storage apparatuses 101. When this happens, the grouping processing unit 209 executes the processing of step S1801 to step S1803 for each record of the configuration information property weighting table 1000.

In step S1801, the grouping processing unit 209 judges whether the weight for a record of a processing target in the configuration information property weighting table 1000 is larger than "0" or not. When the grouping processing unit 209 determines that the weight is larger than "0," the processing proceeds to step S1802; and when the grouping processing unit 209 determines that the weight is not larger than "0," it proceeds to the next record as the processing target.

In step S1802, the grouping processing unit 209 requests the configuration information, which is necessary to judge the configuration information or content property, from the storage apparatus 101 which is the processing target. Under this circumstance, the configuration information collection unit 212 for the storage apparatus 101 which has received the request collects the configuration content of the relevant storage apparatus 101 and transmits the collected configuration content to the master (the grouping processing unit 209).

Then, the grouping processing unit 209 stores the acquired configuration content in the configuration information table 1200 (step S1803).

After receiving all pieces of the configuration information to be used for the calculation of the similarity level from the processing target storage apparatus 101, the grouping processing unit 209 executes processing of step S1804.

In step S1804, the grouping processing unit 209 requests the communication information from the processing target storage apparatus 101. More specifically, the grouping processing unit 209 transmits the information of the all-apparatus information table 800 (IP addresses) to the processing target storage apparatus 101. The storage apparatus 101 (for example, the grouping processing unit 209) which has received the IP addresses collects information about whether communication to other storage apparatuses 101, excluding its own storage apparatus 101, is possible or not and the communication time, and transmits the collected information about whether the communication is possible or not and the collected communication time, as the communication information, to the master (the grouping processing unit 209).

Then, the grouping processing unit 209 stores the acquired communication information in the inter-apparatus communication information table 1300 (step S1805).

After executing the processing of step S1801 to step S1805 with respect to all the storage apparatuses 101, the grouping processing unit 209 executes processing of step S1901 to step S1907 (FIG. 19) with respect to combinations (X, Y) of all the storage apparatuses 101. When this happens, the grouping processing unit 209 executes the processing of step S1903 to step S1905 for each record of the configuration information property weighting table 1000. In the following explanation, a storage apparatus 101 which is a communication source will be distinguished from a storage apparatus 101 which is a communication destination, by referring to the communication source storage apparatus 101 as storage apparatus X and the communication destination storage apparatus 101 as storage apparatus Y.

In step S1901, the grouping processing unit 209 judges whether communication from storage apparatus X to storage apparatus Y is possible or not. When the grouping processing unit 209 determines that the communication is possible, the processing proceeds to step S1902; and when the grouping processing unit 209 determines that the communication is not possible, the processing proceeds to step S1906.

In step S1902, the grouping processing unit 209 sets "1" to the similarity level.

Then, the grouping processing unit 209 judges whether the weight for a record of the processing target in the configuration information property weighting table 1000 is larger than "0" or not (step S1903). When the grouping processing unit 209 determines that the weight is larger than "0," the processing proceeds to step S1904; and when the grouping processing unit 209 determines that the weight is not larger than "0," it proceeds to the next record as the processing target.

In step S1904, the grouping processing unit 209 judges whether the configuration information property in the record of the processing target is satisfied or not (that is, whether the configuration information property of storage apparatus X matches the configuration information property of storage apparatus Y or not). When the grouping processing unit 209 determines that the configuration information property is satisfied, the processing proceeds to step S1905; and when the grouping processing unit 209 determines that the configuration information property is not satisfied, it proceeds to the next record as the processing target.

In step S1905, the grouping processing unit 209 adds the weight for the record of the processing target to the similarity level and proceeds to the next record as the processing target.

In step S1906, the grouping processing unit 209 sets "0" to the similarity level.

After reflecting all the configuration information properties of storage apparatus X and storage apparatus Y in the similarity level, the grouping processing unit 209 executes processing of step S1907.

In step S1907, the grouping processing unit 209 stores the calculated similarity level in the similarity level table 1400 and proceeds to the next combination as the processing target.

After calculating the similarity levels of the combinations (X, Y) of all the storage apparatuses 101 and storing them in the similarity level table 1400, the grouping processing unit 209 terminates the similarity level table creation processing.

Figure 20:
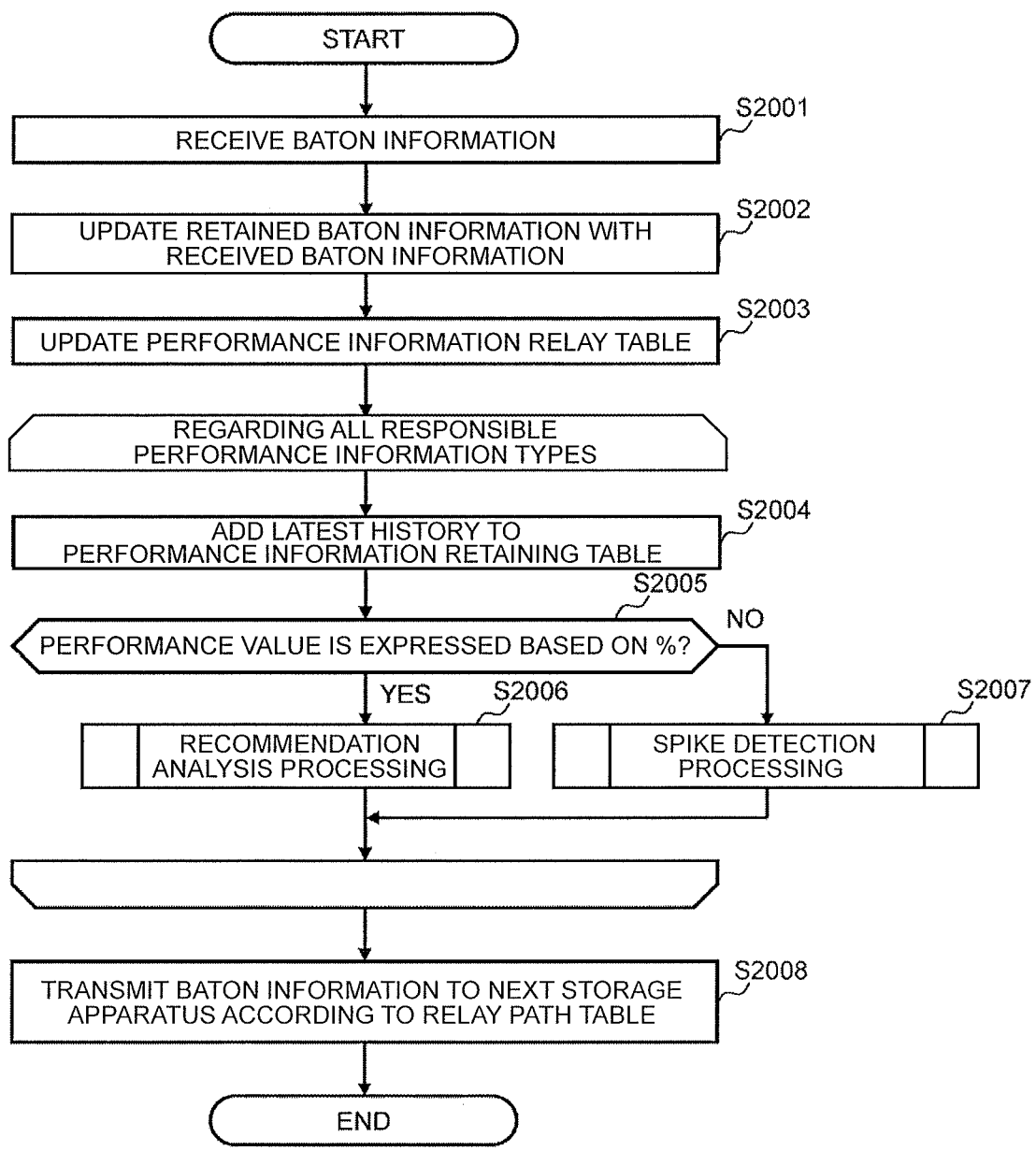
FIG. 20 is a diagram illustrating an example of a processing sequence for performance information relay processing.

FIG. 20 is a diagram illustrating an example of a processing sequence for the performance information relay processing. The performance information relay processing is executed by a storage apparatus 101 which has received the baton information 207 (FIG. 2).

The relay control unit 210 for the storage apparatus 101 receives the baton information 207 (step S2001).

Then, the relay control unit 210 updates the baton information 207, which is stored (or retained) in the memory 203, with the received baton information 207 (step S2002).

Next, the relay control unit 210 updates the performance information relay table 216 (step S2003). More specifically, the relay control unit 210 updates the respective performance values of its own storage apparatus 101 in the performance information relay table 216, which is included in the baton information 207 stored in the memory 203, with the latest performance values collected by the performance information collection unit 213.

Subsequently, the relay control unit 210 executes processing of step S2004 to step S2007 with respect to all its responsible performance information types.

In step S2004, the relay control unit 210 adds the performance values of the received baton information 207, as the latest history, to the performance information retaining table 208. More specifically, the relay control unit 210 acquires the performance values of all the storage apparatuses 101 of the performance information type, which is the processing target, from the performance information relay table 216 of the received baton information 207 and adds the acquired performance values, as the latest history, to the performance information retaining table 208.

Then, the relay control unit 210 judges whether the performance value of the performance information type which is the processing target is expressed based on "%" or not (step S2005). When the relay control unit 210 determines that the performance value is expressed based on "%" (such as the MP usage rate and the cache usage rate), the processing proceeds to step S2006; and when the relay control unit 210 determines that the performance value is not expressed based on "%" (such as the Port IOPS and the port transfer speed), the processing proceeds to step S2007.

In step S2006, the relay control unit 210 executes recommendation analysis processing. Incidentally, the recommendation analysis processing will be described later with reference to FIG. 21.

In step S2007, the relay control unit 210 executes spike detection processing. Incidentally, the spike detection processing will be described later with reference to FIG. 22.

After executing the analysis processing with respect to all the responsible performance information types, the relay control unit 210 executes processing of step S2008.

In step S2008, the relay control unit 210 transmits the baton information 207 to the next storage apparatus 101 in accordance with the relay path table 214, and then terminates the performance information relay processing.

Figure 21:
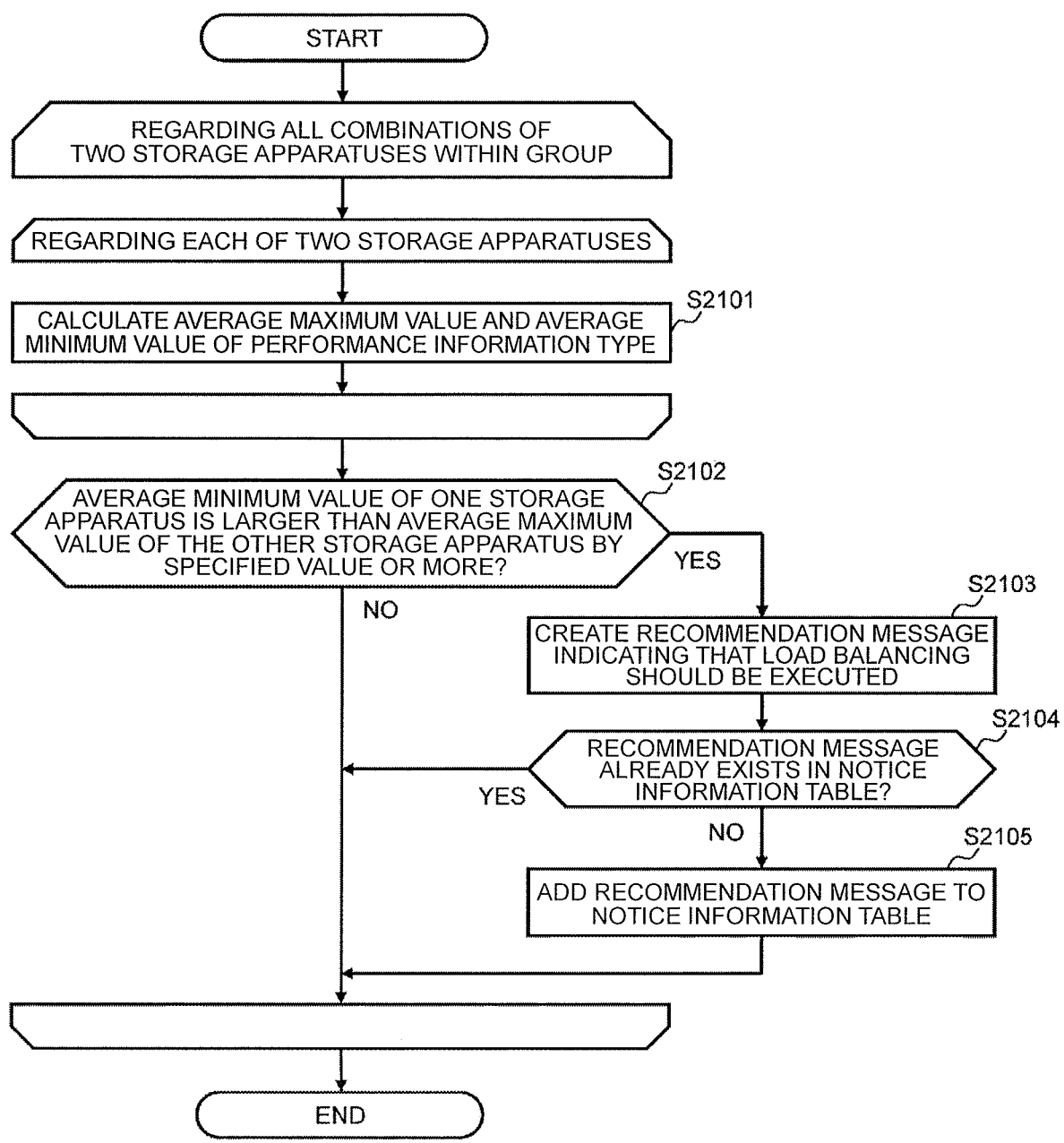
FIG. 21 is a diagram illustrating an example of a processing sequence for recommendation analysis processing.

FIG. 21 is a diagram illustrating an example of a processing sequence for the recommendation analysis processing. During the recommendation analysis processing, the relay control unit 210 executes processing of step S2101 to step S2105 with respect to all combinations of two storage apparatuses 101 within the relevant group. When this happens, the relay control unit 210 executes step S2101 for each of the two storage apparatuses 101.

In step S2101, the relay control unit 210 refers to the performance information retaining table 208 and calculates an average maximum value and an average minimum value with respect to its responsible performance information type.

After calculating the average maximum value and the average minimum value for each of the two storage apparatuses 101, the relay control unit 210 judges whether the average minimum value of one storage apparatus 101 of the two storage apparatuses 101 is larger than the average maximum value of the other storage apparatus 101 by a specified value or not (step S2102). When the relay control unit 210 determines that the average minimum value of one storage apparatus 101 is larger than the average maximum value of the other storage apparatus 101 by the specified value, the processing proceeds to step S2103; and when the relay control unit 210 determines that the average minimum value of one storage apparatus 101 is not larger than the average maximum value of the other storage apparatus 101 by the specified value, it proceeds to the next combination as the processing target.

In performing the recommendation analysis processing, a method for judging whether the load balancing is necessary or not is not limited to what has been described above. For example, the relay control unit 210 may compare the largest maximum value of one storage apparatus 101 with the smallest minimum value of the other storage apparatus 101 within a specified period. Furthermore, for example, the relay control unit 210 may compare a median value of one storage apparatus 101 with a median value of the other storage apparatus 101 within a specified period and judge whether or not the difference is a specified value or more. In other words, since the respective storage apparatuses 101 belonging to the same group have close properties, a relative comparison may be adopted as necessary.

In step S2103, the relay control unit 210 creates a recommendation message indicating that load balancing should be executed between the two storage apparatuses 101.

Then, the relay control unit 210 judges whether the created recommendation message already exists in the notice information table 217 or not (step S2104). When the relay control unit 210 determines that the created recommendation message already exists, the processing proceeds to the next combination as the processing target; and when the relay control unit 210 determines that the created recommendation message does not exist, the processing proceeds to step S2105.

In step S2105, the relay control unit 210 adds the created recommendation message to the notice information table 217 and proceeds to the next combination as the processing target. Incidentally, when the number of records of the notice information table 217 exceeds a specified number, the relay control unit 210 deletes the oldest record.

After analyzing whether the load balancing is necessary or not with respect to all the combinations of the two storage apparatuses 101 within the relevant group, the relay control unit 210 terminates the recommendation analysis processing.

Figure 22:
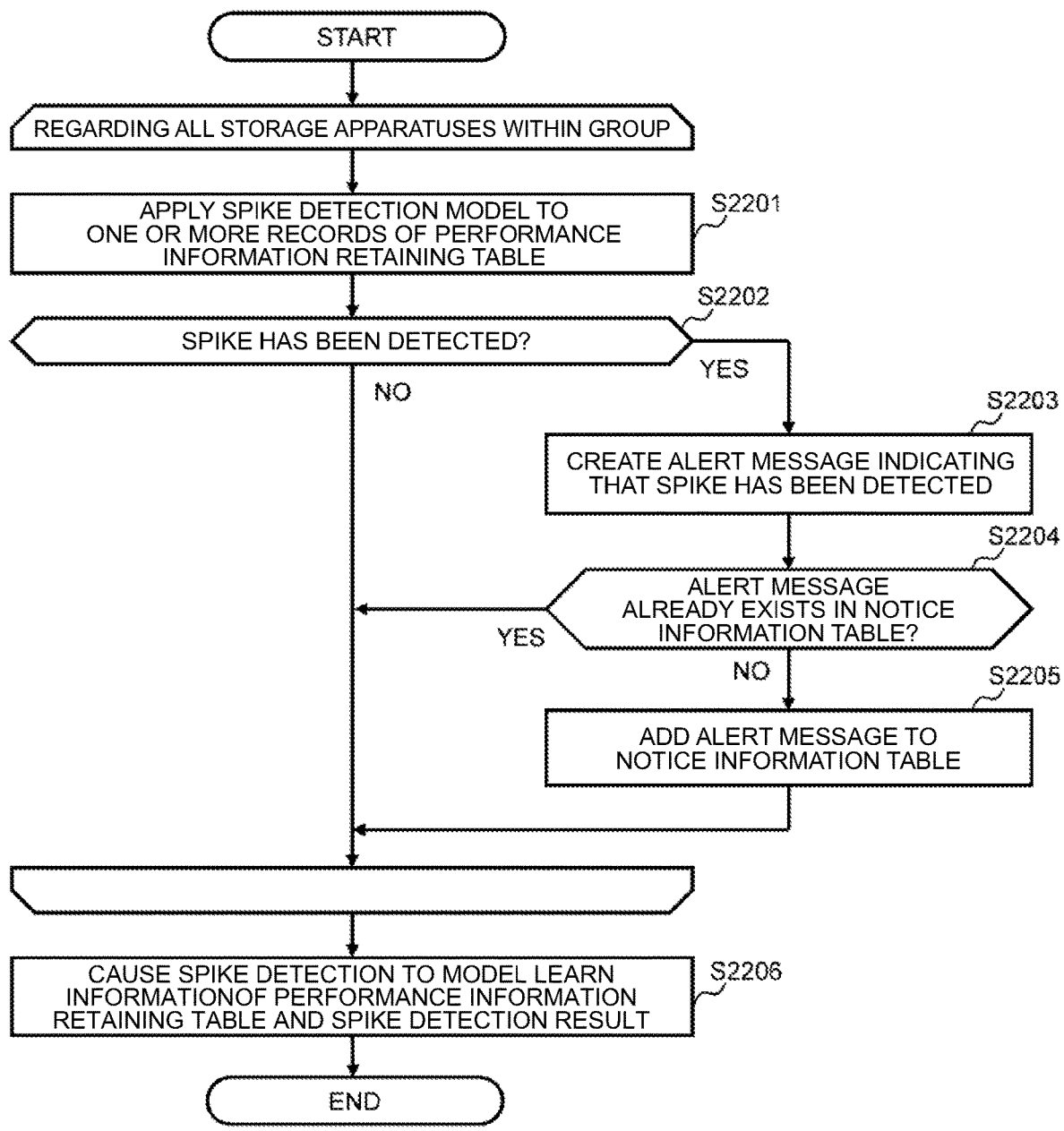
FIG. 22 is a diagram illustrating an example of a processing sequence for spike detection processing.

FIG. 22 is a diagram illustrating an example of a processing sequence for the spike detection processing. During the spike detection processing, the relay control unit 210 executes processing of step S2201 to step S2205 with respect to all the storage apparatuses 101 within the relevant group.

In step S2201, the relay control unit 210 applies the spike detection model 218 to one or more records of its responsible performance information type in the performance information retaining table 208. When the maximum value and/or the minimum value of the performance value are input, the spike detection model 218 outputs a probability of spike occurrence within a specified period (spike occurrence probability).

Then, the relay control unit 210 judges whether a spike has been detected or not (whether the spike occurrence probability exceeds a threshold value or not) (step S2202). When the relay control unit 210 determines that the spike has been detected, the processing proceeds to step S2203; and when the relay control unit 210 determines that the spike has not been detected, it proceeds to the next storage apparatus 101 as the processing target.

In step S2203, the relay control unit 210 creates an alert message indicating that the spike has been detected.

Then, the relay control unit 210 judges whether the created alert message already exists in the notice information table 217 or not (step S2204). When the relay control unit 210 determines that the created alert message exists, it proceeds to the next storage apparatus 101 as the processing target; and when the relay control unit 210 determines that the created alert message does not exist, the processing proceeds to step S2205.

In step S2205, the relay control unit 210 adds the created alert message to the notice information table 217 and proceeds to the next storage apparatus 101 as the processing target. Incidentally, when the number of records in the notice information table 217 exceeds a specified number, the relay control unit 210 deletes the oldest record.

After analyzing whether any spike exists or not with respect to all the storage apparatuses 101, the relay control unit 210 proceeds to processing of step S2206.

In step S2206, the relay control unit 210 causes the spike detection model 218 to learn the information of the performance information retaining table 208, which has been input to the spike detection model 218, and the spike detection result (for example, whether any spike has been detected or not), thereby terminating the spike detection processing. The spike detection model 218 is provided for each group and each group is a set of the storage apparatuses 101 with close properties, so that the above-described learning can effectively enhance, for example, spike detection accuracy of the spike detection model 218.

Figure 23:
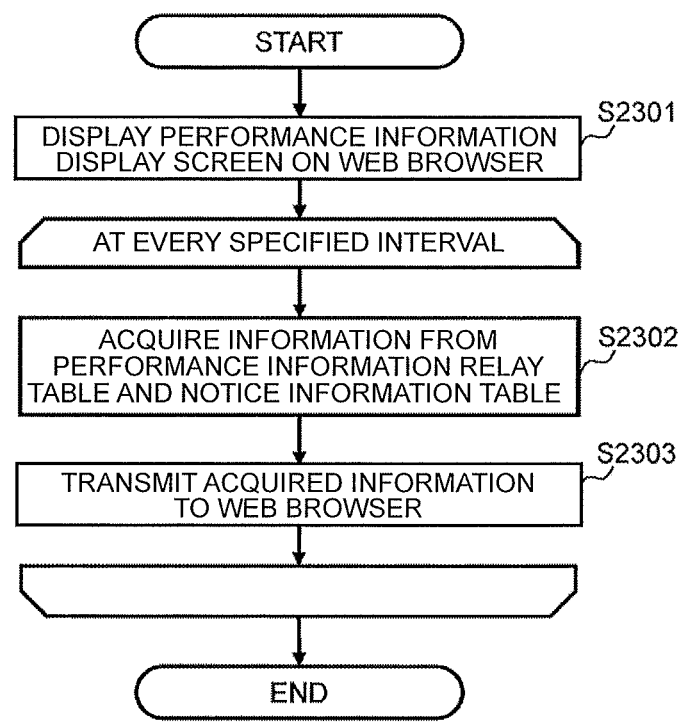
FIG. 23 is a diagram illustrating an example of a processing sequence for performance information display processing.

FIG. 23 is a diagram illustrating an example of a processing sequence for performance information display processing. The performance information display processing is executed based on access from the web browser 226.

The display processing unit 211 transmits information of the performance information display screen (for example, an HTML file) to the web browser 226. After receiving such information, the web browser 226 displays the performance information display screen (step S2301). Incidentally, the performance information display screen will be described with reference to FIG. 26.

As the web browser 226 sends an update request to the display processing unit 211 at specified intervals, the display processing unit 211 executes processing of step S2302 and step S2303 at every specified interval.

In step S2302, the display processing unit 211 acquires the performance information from the performance information relay table 216 and acquires a message (content) from the notice information table 217.

In step S2303, the display processing unit 211 transmits the acquired information to the web browser 226. Incidentally, the web browser 226 updates the performance information display screen based on the received information.

FIG. 24 is a diagram illustrating an example of the grouping screen (a grouping screen 2400). The grouping screen 2400 is a screen displayed by the web browser 226.

The grouping screen 2400 is configured by including an all-apparatus information input area 2401, a row addition button 2402, a performance information type selection area 2403, a configuration information property weighting input area 2404, an upper limit and lower limit input area 2405, a grouping execution button 2406, a grouping result display area 2407, and a performance information relay start button 2408.

The all-apparatus information input area 2401 is an area capable of inputting IP addresses of the storage apparatuses 101. The user can add an input field for the all-apparatus information input area 2401 by pressing the row addition button 2402 via the input device 224.

The performance information type selection area 2403 is an area capable of selecting performance information types to be analyzed (or monitored). The configuration information property weighting input area 2404 is an area capable of inputting weights to configuration information properties. The upper limit and lower limit input area 2405 is an area capable of inputting the upper limit and the lower limit of the number of the storage apparatuses 101 within the relevant group. The grouping execution button 2406 is a button to start the grouping processing.

The grouping result display area 2407 is an area capable of displaying the result of the grouping processing. The performance information relay start button 2408 is a button to start the performance information relay processing. Incidentally, the grouping result display area 2407 and the performance information relay start button 2408 are displayed after the execution of the grouping processing.

Figure 25:
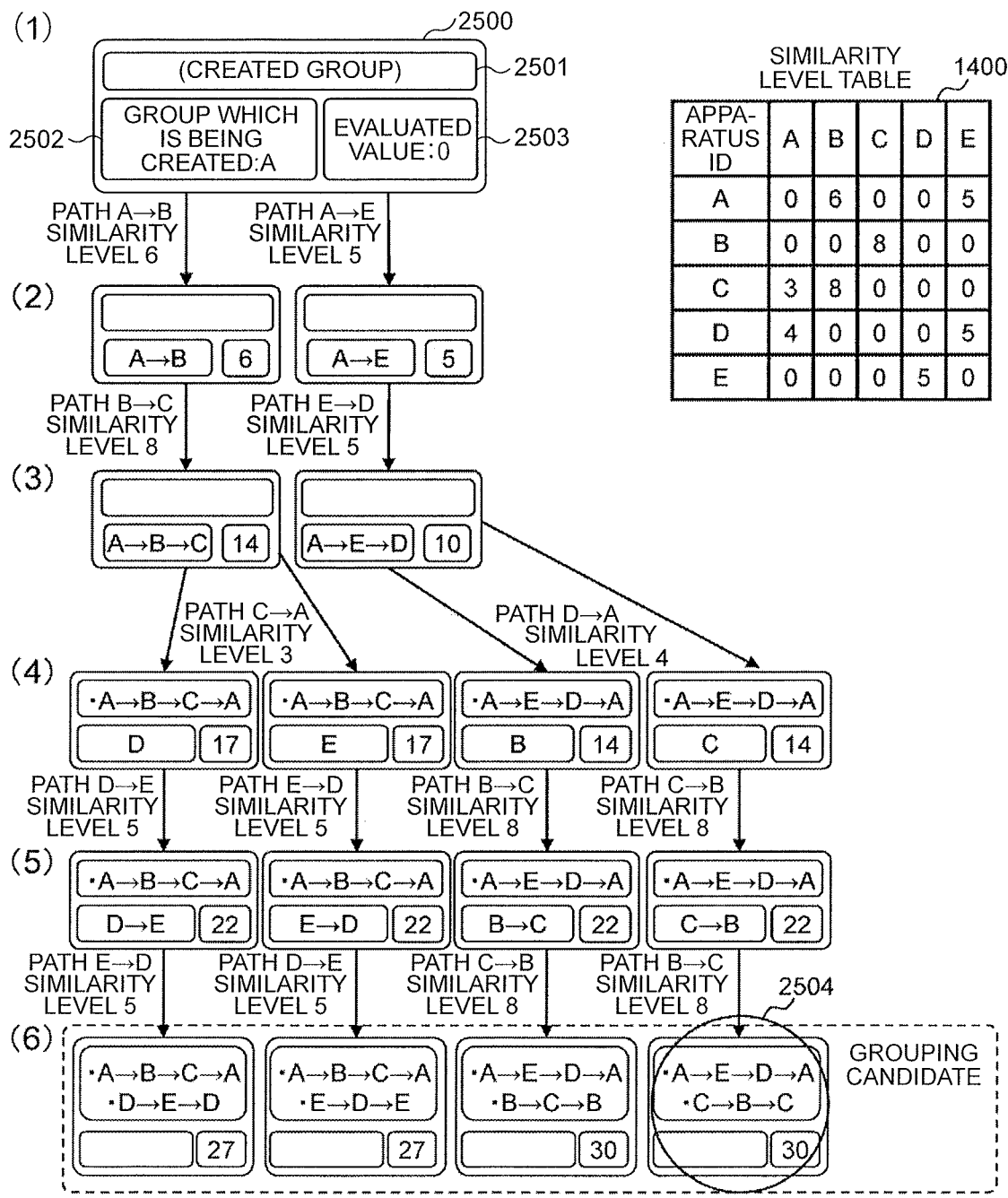
FIG. 25 is a diagram illustrating an example of grouping.

FIG. 25 is a diagram illustrating an example of the grouping. The following explanation will be given by taking an example of a width-prioritized search as a search for grouping, but the search for grouping is not limited to this width-prioritized search. For example, a depth-prioritized search may be used. In other words, a search algorithm capable of forming a relay path and collecting the storage apparatuses 101 with close properties within the range between the lower limit and the upper limit can be adopted as necessary.

The grouping processing unit 209 searches for grouping based on the similarity level table 1400 and creates a plurality of pieces of grouping candidate information 2500. The grouping candidate information 2500 is configured by including a created group 2501, a group which is being created 2502, and an evaluated value 2503.

Then, the grouping processing unit 209 determines the created group 2501 of the grouping candidate information 2500 with the highest evaluated value 2503, from among the created grouping candidate information 2500, as a group in which the storage apparatuses 101 with close properties are collected.

An example of creation of the grouping candidate information 2500 will be explained below.
(First Step)

The grouping processing unit 209 sets an arbitrary storage apparatus 101 as a starting point. In this example, storage apparatus A is selected as the starting point and "A" is set to the group which is being created 2502. Incidentally, "0" is set as an initial value of the evaluated value 2503.
(Second Step)

There are two options from storage apparatus A, that is, storage apparatuses B and E; and the grouping processing unit 209 firstly starts searching for storage apparatus B as appropriate. The grouping processing unit 209 sets "A→B" to the group which is being created 2502. Furthermore, since the similarity level in consideration of the communication from storage apparatus A to storage apparatus B is "6," the grouping processing unit 209 sets "6" to the evaluated value 2503. Incidentally, there is no created group at this point in time, so that no value is set to the created group 2501.

Then, the grouping processing unit 209 proceeds to searching for the other storage apparatus E. The grouping processing unit 209 sets "A→E" to the group which is being created 2502. Furthermore, since the similarity level in consideration of the communication from storage apparatus A to storage apparatus E is "5," the grouping processing unit 209 sets "5" to the evaluated value 2503.
(Third Step)

There is one option from storage apparatus B, that is, storage apparatus C; and the grouping processing unit 209 proceeds to searching for storage apparatus C. The grouping processing unit 209 sets "A→B→C" to the group which is being created 2502. Furthermore, since the similarity level in consideration of the communication from storage apparatus B to storage apparatus C is "8," the grouping processing unit 209 sets "14(=6+8)" to the evaluated value 2503.

There is one option from storage apparatus E, that is, storage apparatus D; and the grouping processing unit 209 proceeds to searching for storage apparatus D. The grouping processing unit 209 sets "A→E→D" to the group which is being created 2502. Furthermore, since the similarity level in consideration of the communication from storage apparatus E to storage apparatus D is "5," the grouping processing unit 20 sets "10(=5+5)" to the evaluated value 2503.

(Fourth Step)

Since there is no option from storage apparatus C, the grouping processing unit 209 sets "A→B→C→A" to the created group 2501 in order to return from storage apparatus C to storage apparatus A (so that a relay path will be generated). Since the similarity level in consideration of the communication from storage apparatus C to storage apparatus A is "3," the grouping processing unit 209 sets "17 (=14+3)" to the evaluated value 2503.

Furthermore, the grouping processing unit 209 sets the remaining storage apparatuses D and E as starting points. When storage apparatus D is selected as the starting point, "D" is set to the group which is being created 2502; and when storage apparatus E is selected as the starting point, "E" is set to the group which is being created 2502.

Incidentally, the same applies when the group which is being created 2502 is "A→E→D," so any further explanation will be omitted here.

(Fifth Step)

There is one option from storage apparatus D, that is, storage apparatus E; and the grouping processing unit 209 proceeds to searching for storage apparatus E. The grouping processing unit 209 sets "D→E" to the group which is being created 2502. Furthermore, since the similarity level in consideration of the communication from storage apparatus D to storage apparatus E is "5," the grouping processing unit 209 sets "22(=17+5)" to the evaluated value 2503.

There is one option from storage apparatus E, that is, storage apparatus D; and the grouping processing unit 209 proceeds to searching for storage apparatus D. The grouping processing unit 209 sets "E→D" to the group which is being created 2502. Furthermore, since the similarity level in consideration of the communication from storage apparatus E to storage apparatus D is "5," the grouping processing unit 209 sets "22(=17+5)" to the evaluated value 2503.

(Sixth Step)

Since there is no option from storage apparatus E, the grouping processing unit 209 sets "D→E→D" to the created group 2501 so as to return from storage apparatus E to storage apparatus D (so that a relay path will be generated). Since the similarity level in consideration of the communication from storage apparatus E to storage apparatus D is "5," the grouping processing unit 209 sets "27(=22+5)" to the evaluated value 2503.

Incidentally, the same applies to a case where the group which is being created 2502 is "E→D," so any further explanation will be omitted here.

When the grouping processing unit 209 repeats the processing as described above and generates a plurality of pieces of grouping candidate information 2500 (when the relay path is formed and the storage apparatuses 101 are successfully formed into a group within the range between the lower limit and the upper limit), it outputs the grouping candidate information 2500 with the highest evaluated value 2503 (for example, the created group 2501) as a search solution 2504.

Incidentally, regarding the above-described search, when the number of the options exceeds a specified number, the grouping processing unit 209 may discard the option(s) whose evaluated value 2503 is low. According to such processing, even when the number of the storage apparatuses 101 is large, the grouping processing unit 209 can conduct grouping by using a realistic computation amount so that the storage apparatuses 101 with close properties will be gathered.

Figure 26:
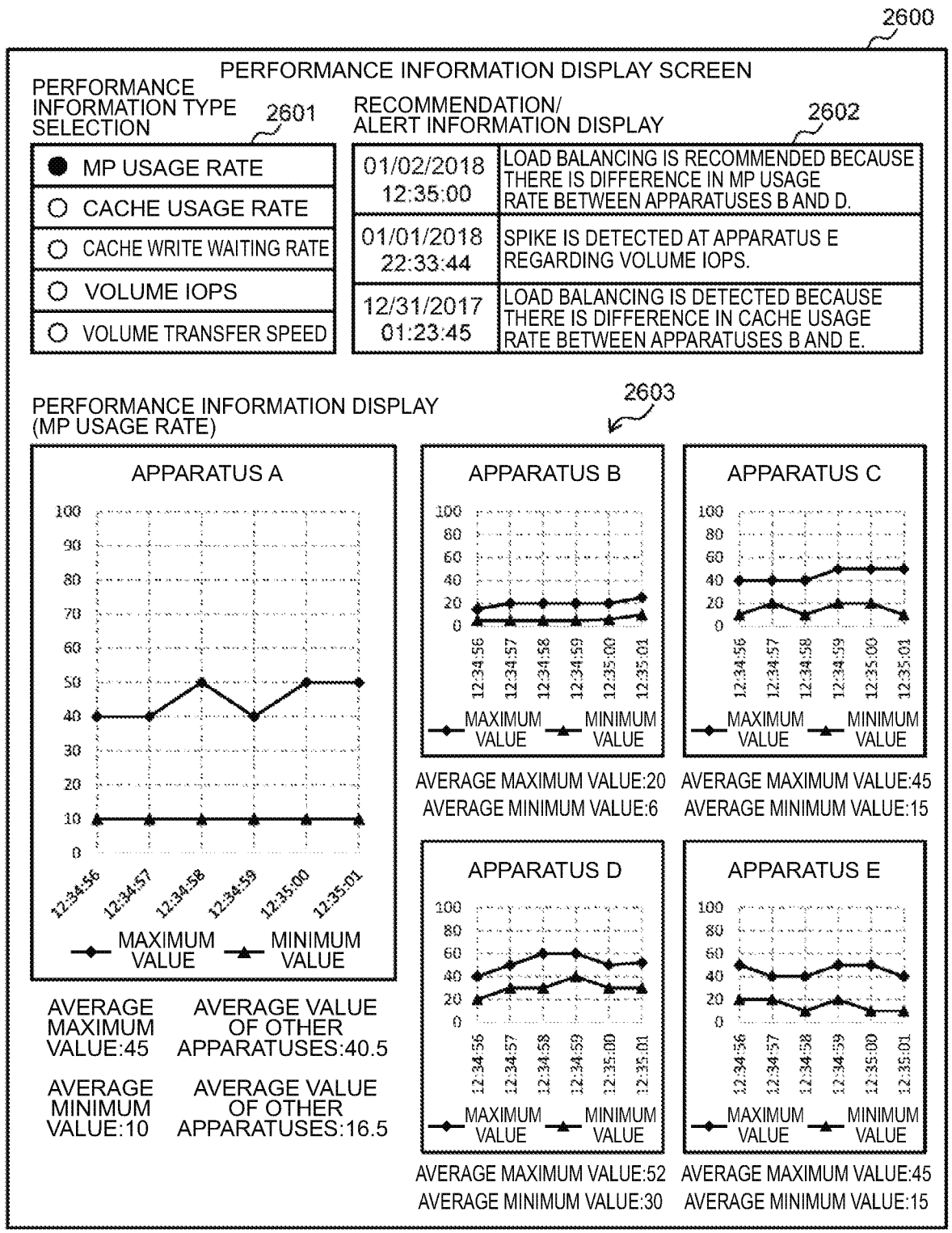
FIG. 26 is a diagram illustrating an example of a performance information display screen.

FIG. 26 is a diagram illustrating an example of the performance information display screen (a performance information display screen 2600). The performance information display screen 2600 is a screen displayed via the web browser 226.

The performance information display screen 2600 is configured by including a performance information type selection button 2601, a recommendation/alert information display area 2602, and a performance information display area 2603.

The performance information type selection button 2601 is a radio button capable of selecting the performance information type. The recommendation/alert information display area 2602 is an area for displaying recommendation messages and alert messages. The performance information display area 2603 is an area for displaying the performance information of each storage apparatus 101 within a group.

The web browser 226 switches the performance information to be displayed in the performance information display area 2603 in accordance with the performance information type of the performance information type selection button 2601 selected by the user via the input device 224 (FIG. 2). On the performance information display screen 2600, the "MP usage rate" is selected by the performance information type selection button 2601, so that the performance information of the MP usage rate is displayed in the performance information display area 2603.

On the performance information display screen 2600, the maximum value and the minimum value of the performance information are plotted by the web browser 226 in the performance information display area 2603 at every specified interval, so that changes of the performance information can be easily recognized.

Furthermore, when there is a new message on the performance information display screen 2600 via the web browser 226, the display of the recommendation/alert information display area 2602 is updated, so that the user can correct a problem(s) of the storage apparatus 101 by recognizing the relevant message.

Furthermore, a list of the performance information of the group of the storage apparatus 101 with close properties is displayed on the performance information display screen 2600, so that the user can easily discover an abnormality in the storage apparatuses 101.

Incidentally, an example of the performance information display screen 2600 is illustrated so that a graph of the performance information of a storage apparatus 101 which is executing the performance information display processing is displayed in a larger size than that of graphs of the performance information of other storage apparatuses 101; however, the performance information display screen 2600 is not limited to this example. For example, the graphs of the performance information of all the storage apparatuses 101 may be displayed in the same size. Furthermore, the performance information of all the storage apparatuses 101 may be displayed as one graph. Furthermore, the performance information may be displayed not as a graph, but as a chart. Furthermore, the performance information may be displayed in a manner different from what has been described above.

Furthermore, the recommendation message(s) and the alert message(s) may be displayed in a manner different from the manner indicated on the performance information display screen 2600.

When the above-described storage system 100 is employed, it is unnecessary to provide a management server for managing the storage apparatuses 101 and, therefore, it is possible to reduce cost relating to the management server.

Furthermore, when the above-described storage system 100 is employed, a group for cycling the storage apparatuses 101 is formed with respect to the management of the storage apparatuses 101 and, therefore, a simple network configuration can be formed. Furthermore, when the above-described storage system 100 is employed, the performance information of the storage apparatuses 101 with close properties is relatively compared and, therefore, it is unnecessary to collect the performance information over a long period of time and it is possible to promptly detect a problem(s) of the performance. Furthermore, when the above-described storage system 100 is employed, the recommendation message(s) and the alert message(s) are displayed and, therefore, the user can correct a problem(s) of the performance.

(2) Other Embodiments

Incidentally, in the aforementioned embodiment a case has been described where the present invention is applied to the storage system 100; however, this invention is not limited to the aforementioned embodiment and can be applied to a wide variety of kinds of storage systems, storage apparatuses, and performance evaluation methods.

Furthermore, in the aforementioned embodiment a case where the baton information 207 is configured by including the relay path table 214, the performance information relay table 216, the performance information type table 215, the notice information table 217, and the spike detection model 218 is described. However, the present invention is not limited to this example and the baton information 207 may not include the relay path table 214 and/or the performance information type table 215. In this case, the information which is not included is transmitted by the master to each storage apparatus 101. Furthermore, the baton information 207 may not include the spike detection model 218. In this case, the spike detection model 218 is transmitted by the master to each storage apparatus 101.

Furthermore, in the aforementioned embodiment, a case where the management terminal 102 is equipped with the web browser 226 is described. However, the present invention is not limited to this example and the management terminal 102 may be equipped with a performance analysis program. In this case, the display processing unit 211 includes a configuration for transmitting information such as the grouping result and the performance information to the management terminal 102 instead of the configuration for generating and transmitting the HTML file to the management terminal 102. After receiving the information such as the grouping result and the performance information, the performance analysis program for the management terminal 102 generates screens (the grouping screen 2400 and the performance information display screen) and displays them on the display device 225.

Furthermore, in the aforementioned embodiment a case where the user selects the master from among the plurality of storage apparatuses 101 has been described. However, the present invention is not limited to this example and the management terminal 102 may be set as the master. In this case, the management terminal 102 includes the grouping processing unit 209 and the configuration information collection unit 212. Furthermore, the storage apparatus 101 includes the relay control unit 210, the display processing unit 211, and the performance information collection unit 213 as the storage management program 206.

Furthermore, in the aforementioned embodiment a case has been described where the similarity level table creation processing is to determine whether the communication is possible or not; and when the communication is possible, "1" is set to the similarity level; and when the communication is impossible, "0" is set to the similarity level. However, the present invention is not limited to this example; and when it is known in advance that all the storage apparatuses 101 can communicate with each other, the judgment to check whether the communication is possible or not may be omitted and "1" may be set to the similarity level. Furthermore, for example, when whether the communication is possible or not is known in advance with respect to all the storage apparatuses 101, the user may set the information about whether the communication is possible or not (for example, by setting "−1" to the inter-apparatus communication information table 1300) or may omit the judgment to check whether the communication is possible or not and set the similarity level.

Furthermore, in the aforementioned embodiment a case where the web browser 226 issues the update request to the display processing unit 211 at specified intervals has been described. However, the present invention is not limited to this example and the display processing unit 211 may transmit the performance information, the recommendation message(s), and the alert message(s) to the web browser 226 at specified intervals.

Furthermore, various kinds of data in the aforementioned embodiment have been explained by using XX tables and XX files for the purpose of illustration; however, the data structures are not limited and the data may be expressed as, for example, XX information.

Furthermore, the information such as programs, tables, and files for implementing each function in the above explanation can be stored in a memory, storage devices such as hard disks and SSDs, or storage media such as Integrated Circuit (IC) cards, Secure Digital (SD)™ cards, and Digital Versatile Discs (DVDs).

Moreover, the above-described configurations may be changed, rearranged, combined, or omitted as appropriate within a range not exceeding the gist of the present invention.

Furthermore, the present invention is not limited to what has been described above and may include, for example, the following characteristic configurations.

A storage apparatus (for example, a storage apparatus 101) is a storage apparatus including a control unit (such as the controller 201, the MPU 202, the storage management program 206, and the relay control unit 210) and an output unit (such as the controller 201, the MPU 202, the storage management program 206, and the display processing unit 211). The above-mentioned control unit receives cyclic information (such as the baton information 207, the performance information relay table 216, and the notice information table 217) which is cycled in a specific group where the relevant storage apparatus and storage apparatuses with close properties are classified, and which includes the performance information (for example, arbitrary metric values such as the performance values, the MP usage rate, the cache usage rate, the cache write waiting rate, the port IOPS, the port transfer speed, the average port response time, the volume IOPS, the volume transfer speed, and the average volume response time) of each storage apparatus belonging to the above-mentioned specific group and the evaluation information (such as the content of the notice information table 217, recommendation messages, and alert messages) indicating the evaluation result of the performance information of each storage apparatus. The control unit acquires the performance information of the relevant storage apparatus, causes the acquired performance information to be included in the above-described cyclic information (it should be noted that: for example, the performance information in the cyclic information may be overwritten or replaced; and furthermore, for example, the acquired performance information may be added to the cyclic information until it reaches a specified number). The control unit further causes the result of evaluation (the spike detection processing and/or the recommendation analysis processing) of the performance information of the above-described each storage apparatus with respect to a specified evaluation index (for example, one or more performance information types regarding which the relevant storage apparatus is responsible for its analysis) to be included in the above-described cyclic information (it should be noted that, for example, the evaluation result in the cyclic information may be overwritten or replaced; and furthermore, for example, the evaluation result may be added to the cyclic information until it reaches a specified number). Then, the control unit transmits the above-described cyclic information to a storage apparatus which is the next cycling destination. The above-described output unit outputs at least one of the performance information included in the above-described cyclic information and the evaluation information included in the above-described cyclic information. It should be noted that: for example, as illustrated in the performance information display screen 2600, the recommendation message(s) and the alert message(s) may be displayed in the recommendation/alert information display area 2602 and a list of the performance information of the respective storage apparatuses 101 in the group may be displayed in the performance information display area 2603. Furthermore, for example, only either one of the information of the recommendation/alert information display area 2602 or the information of the performance information display area 2603 may be displayed. Additionally, for example, the relevant information may be output as files instead of displaying it; furthermore, for example, the relevant information may be transmitted to a previously designated e-mail address instead of displaying it. Furthermore, for example, the relevant information may be printed instead of displaying it. Additionally, for example, these options may be combined; and furthermore, the output timing may be when a request is issued from the web browser 226, periodically, at a specified time, at a previously designated time, or at other timing.

According to the above-described configuration, for example, the cyclic information including the performance information of each storage apparatus belonging to a group is cycled for each group and the evaluation is performed at each storage apparatus with respect to a specified evaluation index, so that a management server for detecting a problem(s) relating to the performance is no longer necessary. Furthermore, for example, since storage apparatuses with close properties are classified into each group, a relative comparison can be performed by using the performance information of the storage apparatuses with close properties; and, therefore, even if the amount of the performance information is small, a problem(s) relating to the performance of each storage apparatus can be detected. Consequently, according to the above-described configuration, a problem(s) relating to the performance of the storage apparatuses can be detected appropriately. Furthermore, since the cyclic information is output according to the above-described configuration, the user can correct the problem(s) relating to the performance of the storage apparatuses by, for example, checking at least one of the performance information and the evaluation information which are included in the cyclic information.

Furthermore, for example, since the evaluation is performed by using the performance information of the storage apparatuses with close properties, a problem(s) relating to the storage apparatuses can be detected more accurately. Furthermore, for example, since a cyclic path is formed in a group, any surplus path(s) can be excluded (for example, a path between A and C and a path between D and B are unnecessary regarding a cyclic path for ABCDA) and, therefore, security can be enhanced.

Furthermore, the above-described storage apparatus may preferably include a processing unit (such as the controller 201, the MPU 202, the storage management program 206, and the grouping processing unit 209) for creating the above-described specific group. The processing unit can calculate the similarity level based on the configuration information (for example, the configuration information table 1200) indicating the configuration of the plurality of storage apparatuses (such as the model of the relevant storage apparatus 101, the drive 200 mounted in the storage apparatus 101, the port of the I/F 205 mounted in the storage apparatus 101, and a pair of storage apparatuses 101). Further, the processing unit calculates weights which are predetermined (it should be noted that, for example, the weights may be input and determined via the grouping screen 2400; and furthermore, for example, the weights may be input as a setting file and determined; or the weights may be input by other means and determined) for the above-described configuration (for example, the configuration information property weighting table 1000), with respect to all combinations of two storage apparatuses among the above-described plurality of storage apparatuses. It should be noted that the total of the weights may be used as the similarity level as illustrated in FIG. 19 or other methods such as Euclidean distance or Pearson's correlation coefficient may be used to calculate the similarity level. Then the processing unit is configured to search for a grouping based on the calculated similarity level so that the storage apparatuses with close properties will be gathered in the same group.

According to the above-described configuration, for example, when the storage apparatuses can communicate with each other and even if the scale of the storage system becomes larger, the user's burden regarding the creation of groups will not increase because the storage apparatuses form groups.

Furthermore, regarding the above-described storage apparatus, the above-described processing unit may preferably create the above-described specific group by checking whether or not the above-described plurality of storage apparatuses can communicate with each other and searching for a grouping so that a cyclic path can be formed based on a communication direction capable of communication (for example, see the example of grouping in FIG. 25).

According to the above-described configuration, for example, a group can be formed without having the user recognize whether or not the storage apparatuses can communicate with each other.

Furthermore, the above-described storage apparatus may include a storage unit (such as the drive 200, the memory 203, and the performance information retaining table 208). The above-described specified evaluation index is composed of a plurality of evaluation indexes (for example, the performance information types indicated in the performance information type selection area 2403) and the above-described plurality of evaluation indexes are allocated so that each storage apparatus described above will become equally responsible for the evaluation (for example, the performance information type table 215. It should be noted that the allocation may be performed by the master or the user, or each storage apparatus 101 may sequentially determine its own responsibility). The above-described control unit receives the above-described cyclic information, it accumulates the performance information of the above-described each storage apparatus, which is used for the evaluation with respect to the allocated evaluation indexes, in the above-described storage unit. The control unit acquires the performance information of the relevant storage apparatus, it may preferably update the performance information of the above-described cyclic information with the acquired performance information (for example, see FIG. 20).

According to the above-described configuration, for example, the storage apparatus accumulates the performance information, regarding which it is responsible for its evaluation, in its own apparatus and updates the cyclic information with its own performance information (or causes the latest performance information to be included in the cyclic information), so that it is possible to avoid the cyclic information from becoming bloated. Furthermore, for example, since the responsibilities for the evaluation are equally allocated to the storage apparatuses, loads on processors for the storage apparatuses can be distributed.

Furthermore, the above-described control unit may preferably cause the result of the relative comparison of the evaluation information of the respective storage apparatuses stored in the storage unit with respect to the allocated evaluation index to be included in the cyclic information. For example, the result may be a recommendation message(s). Furthermore, for example, the result may be a message indicating that there is a difference between the average maximum value and/or the average minimum value [for example, a message indicating that there is a difference in the MP usage rate between apparatuses B and D].

According to the above-described configuration, for example, the result of the relative comparison of the evaluation information of the respective storage apparatuses is output, so that the user can promptly correct a problem(s) relating to the storage apparatuses.

Furthermore, the above-described control unit may preferably cause the result of detection of a specified phenomenon relating to the allocated evaluation index to be included in the evaluation information of the above-described cyclic information based on the performance information of the above-described each storage apparatus stored in the above-described storage unit. For example, the specified phenomenon may be a spike or a phenomenon that the performance value exceeds a threshold value for a specified amount of time. Additionally, the specified phenomenon may be a phenomenon that no performance value has been detected.

According to the above-described configuration, for example, the result of detection of the specified phenomenon is output, so that the user can promptly recognize the specified phenomenon.

Furthermore, the above-described output unit may preferably transmit at least one of the performance information included in the cyclic information and the evaluation information included in the cyclic information, as information to be displayed on a user terminal. For example, the user terminal may be the management terminal 102 or may be another terminal such as a smartphone possessed by a different user from the user of the management terminal 102. Additionally, for example, the information may be an HTML file, an XML [Extensible Markup Language] file, a file of other file formats or may be the information of the performance information relay table 216 and the information of the notice information table 217.

According to the above-described configuration, for example, when the performance information is displayed, the user can easily compare the performance information of the storage apparatuses with close properties. Furthermore, for example, when the evaluation information is displayed and when the user recognizes any problem relating to the performance, the user can promptly correct the problem.

A highly-reliable storage system can be realized according to the above-described configuration.

REFERENCE SIGNS LIST

100: storage system
101: storage apparatus(es)
102: management terminal

The invention claimed is:
1. A storage apparatus comprising:
a memory;
an input/output device; and
a microprocessor communicatively coupled to the memory and the input/output device, wherein the microprocessor is configured to
receive cyclic information that is cycled within a specific group in which a plurality of storage apparatuses with properties close to a property of the storage apparatus are classified, and that includes performance information of each of the plurality of storage apparatuses belonging to the specific group and evaluation information indicative of an evaluation result of the performance information of each of the plurality of storage apparatuses,
acquire, via the memory, the performance information of the storage apparatus,
combine the acquired performance information with the cyclic information,
combine a result of evaluation of the performance information of each storage apparatus with respect to a specified evaluation index with the cyclic information,
transmit, via the input/output device, the cyclic information to a second storage apparatus which is a next cycling destination, and
output, via the input/output device, at least one of the performance information included in the cyclic information and the evaluation information included in the cyclic information.

2. The storage apparatus according to claim 1, wherein the microprocessor is further configured to form the specific group by calculating a similarity level with respect to all combinations of two storage apparatuses among the plurality of storage apparatuses based on configuration information indicative of a configuration of the plurality of storage apparatuses and a predetermined weight with respect to the configuration, and searching for a grouping based on the calculated similarity level so that the plurality of storage apparatuses with close properties will be gathered in the same group.

3. The storage apparatus according to claim 2, wherein the microprocessor forms the specific group by checking whether the plurality of storage apparatuses are capable of communicating with each other or not and searching for a grouping based on a communication direction capable of communication so that a cyclic path can be formed.

4. The storage apparatus according to claim 1,
wherein, in the memory, the specified evaluation index is composed of a plurality of evaluation indexes;
wherein the plurality of evaluation indexes are allocated, in the memory, so that each storage apparatus will be equally responsible for evaluation; and
wherein the microprocessor is further configured to
receive the cyclic information,
accumulate the performance information of each storage apparatus, which is to be used for evaluation of the allocated evaluation index, in the memory,
receive the performance information of the storage apparatus, and update the performance information of the cyclic information with the acquired performance information.

5. The storage apparatus according to claim 4, wherein the microprocessor causes a result of relative comparison of the evaluation information of each storage apparatus which is stored in the memory, with respect to the allocated evaluation index, to be included in the evaluation information of the cyclic information.

6. The storage apparatus according to claim 4, wherein the microprocessor causes a result of detection of a specified phenomenon relating to the allocated evaluation index, based on the performance information of each storage apparatus which is stored in the memory, to be included in the evaluation information of the cyclic information.

7. The storage apparatus according to claim 1, wherein the input/output device transmits, to a user terminal, at least one of the performance information included in the cyclic information and the evaluation information included in the cyclic information, as information to be displayed on the user terminal.

8. A storage system comprising:
a plurality of storage apparatuses; and
an output device communicatively coupled to the plurality of storage devices,
wherein when each of the plurality of storage apparatuses receives cyclic information that is cycled within a specific group in which storage apparatuses with properties close to a property of a relevant storage apparatus are classified, and that includes performance information of each storage apparatus belonging to the specific group and evaluation information indicative of an evaluation result of the performance information of each storage apparatus, the relevant storage apparatus, via a microprocessor
acquires performance information from a memory of the relevant storage apparatus,
combines the acquired performance information with the cyclic information,
combines a result of evaluation of the performance information of each storage apparatus with respect to a specified evaluation index with the cyclic information, and
transmits the cyclic information to a storage apparatus which is a next cycling destination; and
wherein the output device outputs at least one of the performance information included in the cyclic information and the evaluation information included in the cyclic information.

9. A performance evaluation method comprising:
receiving, via each of a plurality of storage apparatuses, cyclic information that is cycled within a specific group in which storage apparatuses with properties close to a property of a relevant storage apparatus are classified, and that includes performance information of each storage apparatus belonging to the specific group and evaluation information indicative of an evaluation result of the performance information of each storage apparatus;
acquiring, via a microprocessor of the relevant storage apparatus, performance information from a memory of the relevant storage apparatus;
combining, via the microprocessor, the acquired performance information with the cyclic information;
combining, via the microprocessor, a result of evaluation of the performance information of each storage apparatus with respect to a specified evaluation index with the cyclic information;
transmitting, via the microprocessor, the cyclic information to a storage apparatus which is a next cycling destination; and
outputting, via an output device, at least one of the performance information included in the cyclic information and the evaluation information included in the cyclic information.

* * * * *